(12) United States Patent
Ogino et al.

(10) Patent No.: US 12,344,239 B2
(45) Date of Patent: Jul. 1, 2025

(54) VEHICLE CONTROL APPARATUS

(71) Applicant: SUBARU CORPORATION, Tokyo (JP)

(72) Inventors: Shuu Ogino, Tokyo (JP); Kazuya Kozono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 198 days.

(21) Appl. No.: 18/113,841

(22) Filed: Feb. 24, 2023

(65) Prior Publication Data

US 2023/0286496 A1 Sep. 14, 2023

(30) Foreign Application Priority Data

Mar. 11, 2022 (JP) ................................. 2022-038535

(51) Int. Cl.
*B60W 30/09* (2012.01)
*B60W 10/18* (2012.01)
*B60W 10/20* (2006.01)
*B60W 30/095* (2012.01)

(52) U.S. Cl.
CPC ............ *B60W 30/09* (2013.01); *B60W 10/18* (2013.01); *B60W 10/20* (2013.01); *B60W 30/0956* (2013.01); *B60W 2552/53* (2020.02); *B60W 2554/4043* (2020.02); *B60W 2554/80* (2020.02); *B60W 2554/801* (2020.02); *B60W 2554/802* (2020.02)

(58) Field of Classification Search
None
See application file for complete search history.

(56) References Cited

U.S. PATENT DOCUMENTS

| 7,966,127 B2* | 6/2011 | Ono ...................... B60W 10/20 701/96 |
| 8,090,537 B2* | 1/2012 | Nishira ................. B60W 30/09 340/436 |
| 9,896,095 B2* | 2/2018 | Katoh ................. B60W 10/184 |
| 10,220,842 B2* | 3/2019 | Moritani ............... B60W 30/09 |

(Continued)

FOREIGN PATENT DOCUMENTS

| DE | 102016122998 A1 * | 7/2017 | ............ B60W 10/18 |
| JP | 2017-226393 A | 12/2017 | |
| JP | 2023132933 A * | 9/2023 | ............ B60W 30/08 |

*Primary Examiner* — Kevin R Steckbauer
(74) *Attorney, Agent, or Firm* — TROUTMAN PEPPER LOCKE LLP

(57) ABSTRACT

A vehicle control apparatus includes one or more processors that execute a braking delay process and a stopping control process. The braking delay process is related to contact avoidance in which a recognized road-side object is set to a target object, and is a process of performing a control of delaying intervention by braking in a case where the contact avoidance using steering is predicted to be possible, as compared with a case where the contact avoidance using the braking is performed. The stopping control process is a process of performing a control of preventing a vehicle from stopping within a section corresponding to a discontinuous portion in the road-side object in a case where the intervention by the braking is to be delayed, where the discontinuous portion is recognized in the road-side object, and where the vehicle is predicted to stop within the section.

12 Claims, 11 Drawing Sheets

(56) References Cited

U.S. PATENT DOCUMENTS

| | | | |
|---|---|---|---|
| 10,227,071 B2* | 3/2019 | Nishimura | B60W 30/09 |
| 10,266,176 B2* | 4/2019 | Nishimura | B60W 30/09 |
| 10,300,912 B2* | 5/2019 | Nishimura | B60W 30/09 |
| 10,471,954 B2* | 11/2019 | Saiki | G08G 1/165 |
| 10,576,945 B2* | 3/2020 | Sung | B60T 17/22 |
| 11,214,246 B2* | 1/2022 | Doi | B60W 30/0956 |
| 11,305,759 B2* | 4/2022 | Sasagawa | B60W 40/114 |
| 11,479,240 B2* | 10/2022 | Shimbo | B60W 60/0015 |
| 11,505,183 B2* | 11/2022 | Kim | G08G 1/163 |
| 11,597,362 B2* | 3/2023 | Sato | B60W 30/09 |
| 11,738,682 B2* | 8/2023 | Schmitt | B60W 60/00274 701/70 |
| 11,897,458 B2* | 2/2024 | Kamiya | B60T 7/22 |
| 12,090,921 B2* | 9/2024 | Schmitt | B60W 30/181 |
| 2007/0288133 A1* | 12/2007 | Nishira | B62D 15/0265 701/23 |
| 2008/0097699 A1* | 4/2008 | Ono | B62D 15/0265 701/300 |
| 2017/0057498 A1* | 3/2017 | Katoh | B60W 30/09 |
| 2017/0210381 A1* | 7/2017 | Nishimura | G08G 1/166 |
| 2017/0210382 A1* | 7/2017 | Nishimura | G05D 1/0219 |
| 2017/0232964 A1* | 8/2017 | Moritani | B60T 7/22 701/70 |
| 2017/0369054 A1* | 12/2017 | Nishimura | B60W 30/095 |
| 2018/0178783 A1* | 6/2018 | Saiki | B60W 30/09 |
| 2019/0016316 A1* | 1/2019 | Sung | B60T 7/22 |
| 2020/0122719 A1* | 4/2020 | Sasagawa | B60W 30/09 |
| 2020/0307572 A1* | 10/2020 | Doi | B60W 50/0097 |
| 2021/0039636 A1* | 2/2021 | Kamiya | B60W 40/105 |
| 2021/0300307 A1* | 9/2021 | Sato | B60W 30/09 |
| 2021/0362710 A1* | 11/2021 | Choi | G05D 1/021 |
| 2022/0063604 A1* | 3/2022 | Okano | G06V 20/58 |
| 2022/0111871 A1* | 4/2022 | Schmitt | B60Q 1/507 |
| 2022/0314978 A1* | 10/2022 | Yasui | B60W 30/0953 |
| 2023/0120095 A1* | 4/2023 | Horihata | G08G 1/096758 701/301 |
| 2023/0264713 A1* | 8/2023 | Foster | B60W 50/0205 701/24 |
| 2023/0286496 A1* | 9/2023 | Ogino | B60W 30/0956 |
| 2023/0347815 A1* | 11/2023 | Schmitt | B60W 30/181 |
| 2024/0059280 A1* | 2/2024 | Chen | B60W 30/18154 |
| 2024/0246534 A1* | 7/2024 | Sugaya | B60W 30/0956 |

* cited by examiner

VEHICLE CONTROL APPARATUS

CROSS-REFERENCE TO RELATED APPLICATION

The present application claims priority from Japanese Patent Application No. 2022-038535 filed on Mar. 11, 2022, the entire contents of which are hereby incorporated by reference.

BACKGROUND

The disclosure relates to a driving assistance control technique.

Japanese Unexamined Patent Application Publication (JP-A) No. 2017-226393 discloses the following technique. In a case where an obstacle present in a traveling direction of a vehicle is a continuous obstacle, a timing of starting a contact avoidance assistance control is delayed as compared with a case where the obstacle is not the continuous obstacle. Examples of the continuous obstacle include a guardrail on a road. In addition, the greater a degree of gentleness of an inclination of the continuous obstacle is, the greater an amount by which the timing of starting the contact avoidance assistance control is delayed becomes.

SUMMARY

An aspect of the disclosure provides a vehicle control apparatus for a vehicle that includes a braking unit and a steering unit and is configured to recognize an external environment of the vehicle. The vehicle control apparatus includes one or more processors and one or more storage media. The one or more storage media are configured to hold a program to be executed by the one or more processors. The program includes one or more instructions. The one or more instructions cause the one or more processors to execute a braking delay process and a stopping control process. The braking delay process is related to contact avoidance in which a road-side object recognized on a traveling direction side of the vehicle is set to a target object. The braking delay process is a process of performing a control of delaying intervention by braking in a case where the contact avoidance using steering is predicted to be possible, as compared with a case where the contact avoidance using the braking is performed. The braking is to be performed by the braking unit. The steering is to be performed by the steering unit. The stopping control process is a process of performing a control of preventing the vehicle from stopping within a section corresponding to a discontinuous portion in the road-side object in a case where the intervention by the braking is to be delayed by the braking delay process, where the discontinuous portion is recognized in the road-side object, and where the vehicle is predicted to be stopped within the section corresponding to the discontinuous portion on a traveling lane by the contact avoidance using the steering.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
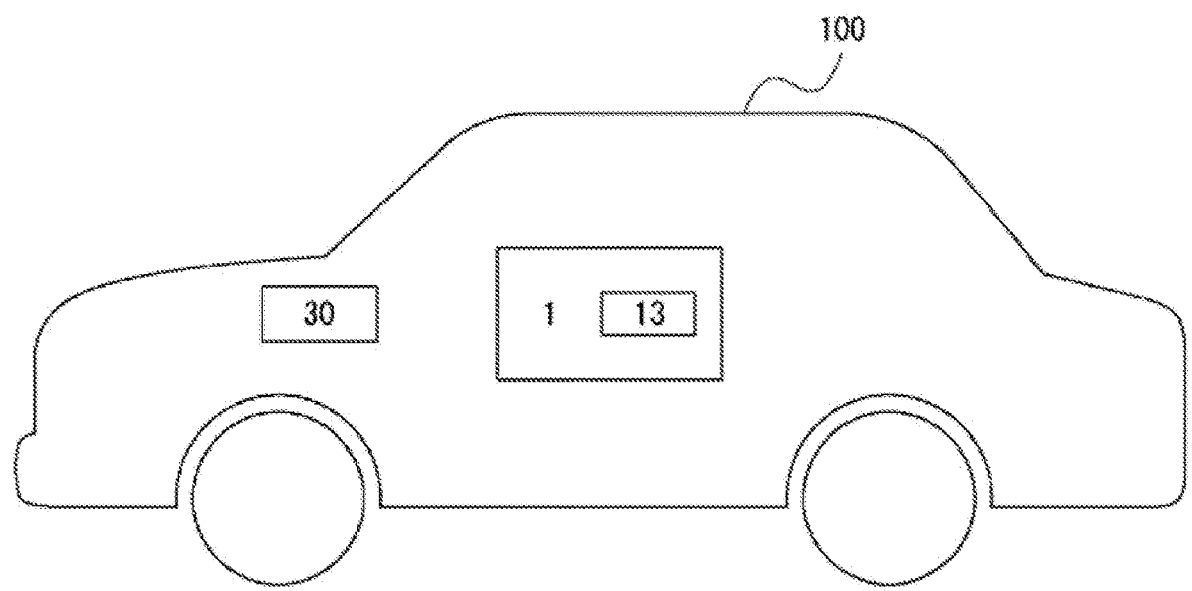
FIG. 1 is a diagram illustrating an outline of a configuration of a vehicle that includes a vehicle control apparatus according to one example embodiment.

Hereinafter, an object that is present along a side of a road on which an own vehicle travels is referred to as a "road-side object". As suggested in JP-A No. 2017-226393, in a case where a target of contact avoidance is a road-side object such as a guardrail, a timing of starting a braking control for the contact avoidance tends to seem earlier to a driver as compared with a case where the target is not the road-side object. In other words, in the case where the target of the contact avoidance is the road-side object, the braking control tends to start earlier than the driver feels a possibility of contact, as compared with the case where the target is not the road-side object. Such a situation can give a feeling of strangeness to the driver. According to the technique disclosed in JP-A No. 2017-226393, it is possible to delay a timing of intervention by braking for the contact avoidance in a case where the target is the road-side object, thereby reducing the feeling of strangeness given to the driver.

However, the technique disclosed in JP-A No. 2017-226393 does not take into consideration a position where the vehicle is to stop in a case where a contact avoidance control targeting the road-side object is performed. Thus, even if the vehicle avoids the road-side object, the vehicle can be involved in a dangerous situation depending on a place where the vehicle has stopped.

It is desirable to prevent a vehicle from stopping in a place with a predicted danger in a case where a contact avoidance control targeting a road-side object is performed, and to thereby improve safety regarding the contact avoidance control.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 2:
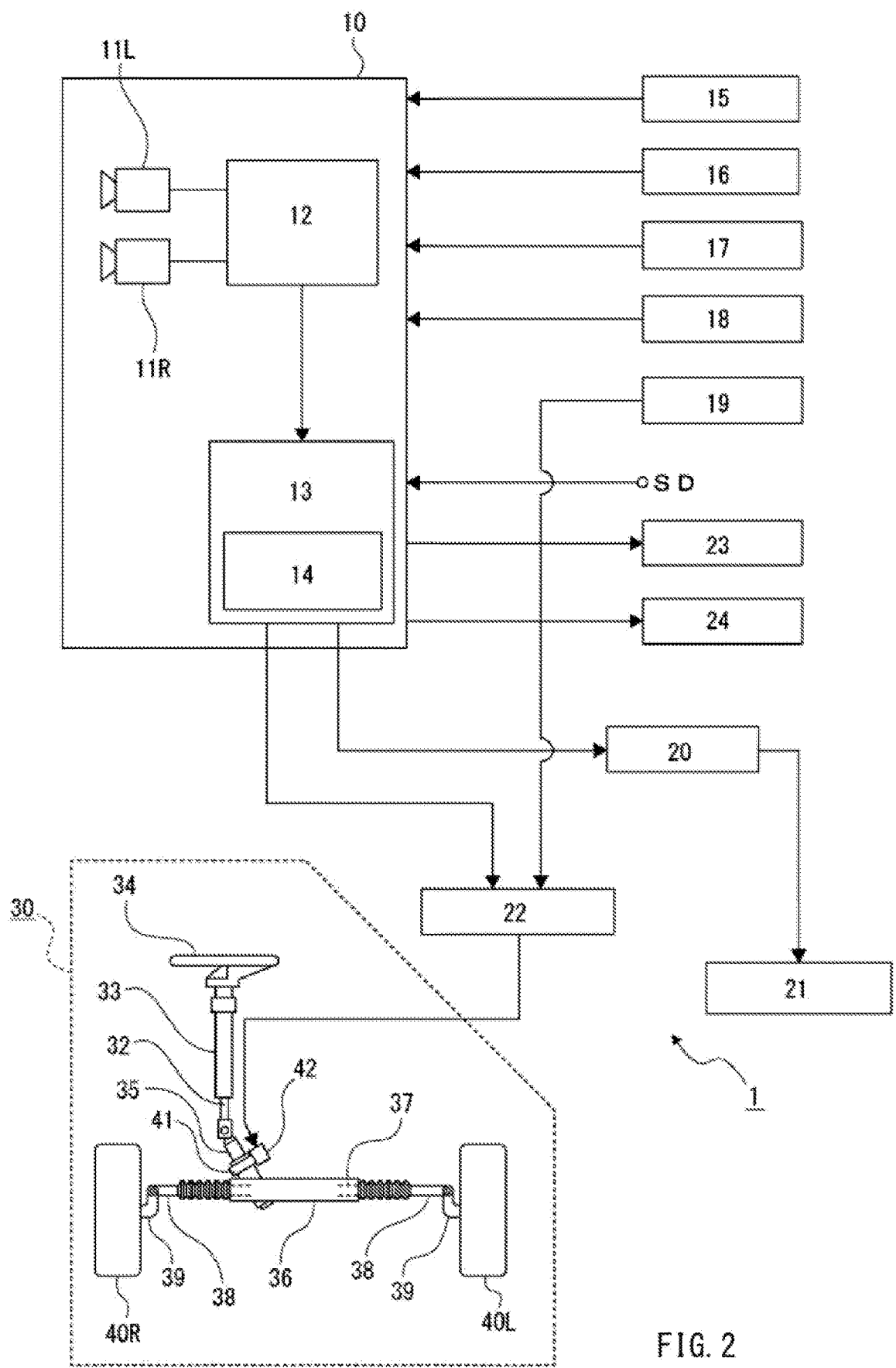
FIG. 2 is an explanatory diagram illustrating a configuration example of a portion of a vehicle control system that includes the vehicle control apparatus according to the example embodiment.

FIG. 1 is a diagram illustrating an outline of a configuration of a vehicle 100 that includes a vehicle control apparatus according to an example embodiment of the disclosure. FIG. 2 is an explanatory diagram illustrating a configuration example of a portion of a vehicle control system 1 that includes the vehicle control apparatus according to the example embodiment. Together with the configuration example of the vehicle control system 1, FIG. 2 also illustrates a configuration example of a steering mechanism 30 included in the vehicle 100.

In the example embodiment, the vehicle 100 may be configured, for example, as a four-wheel vehicle, and may include an engine, a traveling motor, or both as a driving source for wheels. In other words, the vehicle 100 may be configured as: an electric vehicle (EV) that includes the traveling motor out of the engine and the traveling motor as the driving source for the wheels; a hybrid electric vehicle (HEV) that includes both the engine and the traveling motor; or an engine vehicle that includes the engine out of the engine and the traveling motor as the driving source for the wheels.

The vehicle 100 includes an unillustrated braking unit and a steering unit. The braking unit may perform braking of the vehicle 100. The steering unit may allow the vehicle 100 to turn as desired. The steering unit may include the steering mechanism 30 which will be described later.

Herein, the term "braking unit" refers not only to a braking mechanism including, without limitation, a disk brake and a drum brake, but broadly encompasses a configuration that performs vehicle braking by regenerative braking with use of the traveling motor in a case where the vehicle is configured as the electric vehicle or the hybrid electric vehicle.

In addition, the term "steering unit" broadly encompasses a configuration that allows the vehicle 100 to turn as desired in a left-right direction. Examples of such a configuration may include the steering mechanism 30.

The vehicle 100 is configured to recognize an external environment of the vehicle 100. For example, the vehicle 100 according to this example may include an imaging unit 10 and may be thereby configured to recognize the external environment. The imaging unit 10 will be described later.

As illustrated in FIG. 1, the vehicle 100 may include the vehicle control system 1 and the steering mechanism 30. The vehicle control system 1 may include a driving assistance controller 13. In one embodiment, the driving assistance controller 13 may serve as a "vehicle control apparatus".

As illustrated in FIG. 2, the vehicle control system 1 may include a vehicle speed sensor 15, a yaw rate sensor 16, a contact sensor 17, an actual steering angle sensor 18, and a steering torque sensor 19 as sensors related to a contact avoidance control. In addition, the vehicle control system 1 may include a display unit 23 and a sound output unit 24 as units related to the contact avoidance control.

The vehicle speed sensor 15 may detect a speed of the vehicle 100 as an own vehicle speed v. The yaw rate sensor 16 may detect a yaw rate of the vehicle 100.

The contact sensor 17 may detect contact of an object with the vehicle 100. The contact sensor 17 may include, for example, a pressure sensor. In this example, the contact sensor 17 may be provided, for example, on an inner side of a front bumper of the vehicle 100, and may be configured to detect contact of an object with a front end of the vehicle 100.

The actual steering angle sensor 18 may detect, as an actual steering angle, an actual turning angle of wheels 40 to be steered. The wheels 40 to be steered may include a left wheel 40L and a right wheel 40R which will be described later. The actual turning angle of the wheels 40 may be, for example, an angle between each of the wheels 40 and an axis of the vehicle 100 in a front-rear direction.

The steering torque sensor 19 may detect, for example, input torque applied to a steering shaft 32 and thereby detect steering force (steering input torque) inputted by the driver via a steering wheel 34.

The imaging unit 10 may include an imager 11L, an imager 11R, an image processor 12, and the driving assistance controller 13. The imager 11L and the imager 11R may be disposed to capture an image in the traveling direction of the vehicle 100, i.e., in front of the vehicle 100.

Coupled to the imaging unit 10 may be the vehicle speed sensor 15, the yaw rate sensor 16, the contact sensor 17, and the actual steering angle sensor 18. The image processor 12 and the driving assistance controller 13 may be configured to receive detection signals from these sensors. The imaging unit 10 may receive operation information SD. The operation information SD may be information regarding an operation input performed by an occupant such as a driver. The image processor 12 and the driving assistance controller 13 may each be configured to execute a process corresponding to the operation information SD.

The imagers 11L and 11R may be disposed, for example, near an upper portion of a windshield of the vehicle 100. The imagers 11L and 11R may be spaced from each other by a predetermined distance in a vehicle-width direction to measure distances by a so-called stereo method. The imagers 11L and 11R may have optical axes parallel to each other and the same focal length as each other. The imagers 11L and 11R may also have frame periods synchronized with each other and the same frame rate as each other.

An electrical signal, or a captured image signal, obtained by an imaging device of each of the imagers 11L and 11R may be subjected to analog-to-digital (A/D) conversion into a digital image signal, or captured image data. The digital image signal or the captured image data may indicate, in units of pixels, a luminance value corresponding to a predetermined grayscale. The captured image data may be, for example, color image data.

The image processor 12 may include, for example, a microcomputer that includes, without limitation, a central processing unit (CPU), a read-only memory (ROM), and a random-access memory (RAM). The RAM may serve as a work area. The CPU may execute various processes in accordance with a program stored in the ROM.

The image processor 12 may store, in an internal memory, each frame image data serving as the captured image data obtained by the imagers 11L and 11R capturing images in front of the vehicle 100. On the basis of two pieces of captured image data serving as each frame, the image processor 12 may execute a process for recognition of an external environment of the vehicle 100, for example, various processes for recognition of an object present in front of the vehicle 100. For example, the image processor 12 may recognize a regulatory line provided on a road and various three-dimensional objects. Examples of the regulatory line may include a white line and an orange line. Examples of the three-dimensional object may include: a preceding vehicle; a pedestrian; an obstacle; and a guardrail, a curb, and a sidewalk that are present along a road.

Here, the regulatory line refers to a lane line defining a traveling lane of a vehicle. The image processor 12 may recognize a traveling lane of the vehicle 100, i.e., an own vehicle traveling lane, on the basis of information regarding the recognized regulatory line.

In recognizing the three-dimensional object in front of the vehicle 100, the image processor 12 may perform a process on a pair of captured image data, i.e., stereo images, obtained by the imagers 11L and 11R. The process may involve obtaining distance information from an amount of shift between corresponding positions, i.e., parallaxes, in the images on the basis of the principle of triangulation. The image processor 12 may generate, on the basis of the obtained distance information, data indicating a three-dimensional distance distribution, i.e., a distance image. The image processor 12 may perform a process such as publicly known grouping on the basis of the generated distance image. The image processor 12 may thereby recognize the regulatory line and the three-dimensional object such as the guardrail, the curb, the sidewalk, the pedestrian, or the vehicle described above.

The image processor 12 may store information regarding a position of the recognized three-dimensional object as three-dimensional object position information that is expressed as a coordinate position in an x-z coordinate system. In the x-z coordinate system, a z-axis may represent the front-rear direction of the vehicle 100 and an x-axis may represent the left-right direction or a lateral direction of the vehicle 100. For example, regarding the three-dimensional object such as the preceding vehicle, the pedestrian, or the obstacle, the image processor 12 in this example may store information regarding respective positions of a left end point and a right end point of a rear surface of the three-dimensional object. In addition, the image processor 12 may store information regarding a center position between the left end point and the right end point on the rear surface as information regarding a center position of the three-dimensional object.

In addition, regarding the recognized three-dimensional object, the image processor 12 may calculate and store information regarding a three-dimensional object vertical distance, a three-dimensional object vertical relative speed, a three-dimensional object vertical speed, and three-dimensional object vertical acceleration. The three-dimensional object vertical distance may be a separation distance to the three-dimensional object in a z-axis direction, and is hereinafter referred to as a "three-dimensional object vertical distance dz". The three-dimensional object vertical relative speed may be a variation amount per unit time of the three-dimensional object vertical distance dz, and is hereinafter referred to as a "vertical relative speed vrz". The three-dimensional object vertical speed may be a sum of the vertical relative speed vrz and the own vehicle speed v, and is hereinafter referred to as a "vertical speed vz". The three-dimensional object vertical acceleration may be a differential value of the vertical speed vz, and is hereinafter referred to as "vertical acceleration az".

In addition, regarding the recognized three-dimensional object, the image processor 12 may calculate and store information regarding a three-dimensional object lateral distance, a three-dimensional object lateral relative speed, a three-dimensional object lateral speed, and three-dimensional object lateral acceleration. The three-dimensional object lateral distance may be a separation distance to the three-dimensional object in an x-axis direction, and is hereinafter referred to as a "three-dimensional object lateral distance dx". The three-dimensional object lateral relative speed may be a variation amount per unit time of the three-dimensional object lateral distance dx, and is hereinafter referred to as a "lateral relative speed vrx". The three-dimensional object lateral speed may be a sum of the lateral relative speed vrx and a lateral-direction movement speed of the vehicle 100, and is hereinafter referred to as a "lateral speed vx". The three-dimensional object lateral acceleration may be a differential value of the lateral speed vx, and is hereinafter referred to as "lateral acceleration ax".

Among the three-dimensional objects that are recognized vehicles, the image processor 12 may recognize, as a preceding vehicle, the closest vehicle that is present on the own vehicle traveling lane and faces substantially the same direction as the vehicle 100. Note that the image processor 12 may recognize a preceding vehicle whose traveling speed is substantially 0 km/h as a stopped preceding vehicle.

Image recognition result information may include, for example, the above-described information obtained by the image processor 12, i.e., pieces of information regarding the position, the speed, and the acceleration of the three-dimensional object and information regarding the own vehicle traveling lane. Such image recognition result information may be used in various driving assistance controls.

On the basis of the image recognition result information obtained by the image processor 12, the driving assistance controller 13 may perform a control for various kinds of driving assistance.

The driving assistance controller 13 may include a contact avoidance control processor 14. The contact avoidance control processor 14 may include, for example, a microcomputer including, without limitation, a CPU, a ROM, and a RAM, and may execute various processes in accordance with a program stored in the ROM.

For example, the contact avoidance control processor 14 may perform processes related to, for example, autonomous emergency braking (AEB) and automatic emergency steering (AES).

In the contact avoidance control as the AEB or the AES, a risk evaluation value may be calculated on the basis of an external environment recognition result. The risk evaluation value may indicate the magnitude of a risk of contact with an object. Further, for example, a timing of intervention by braking or a timing of intervention by steering may be determined on the basis of the magnitude of the risk indicated by the calculated risk evaluation value.

For example, for each of the three-dimensional objects recognized by the image processor 12, the contact avoidance control processor 14 in this example may calculate the risk evaluation value as a time to contact (TTC) on the basis of the information regarding the three-dimensional vertical distance dz and the vertical relative speed vrz described above. The TTC may be an index indicating how many seconds it takes to come into contact in a case where the current vertical relative speed vrz is maintained. For example, the TTC may be calculated by the following equation.

$TTC = dz/vrz$

The smaller the value of the TTC is, the greater the contact risk may be. The TTC may be a risk evaluation value indicating such a relationship.

On the basis of the above-described value of the TTC, the contact avoidance control processor 14 may determine whether a contact predicted object is present regarding a target object. The target object may be a particular kind of three-dimensional object among the three-dimensional objects recognized by the image processor 12. Here, the contact predicted object refers to an object that is predicted to come into contact with the vehicle 100.

The "particular kind of three-dimensional object" described above refers to a three-dimensional object including a creature that moves, such as a human or an animal. Hereinafter, the creature that moves, such as a human or an animal, is referred to as a "moving creature". In this example, the "particular kind of three-dimensional object" may refer to, for example, a three-dimensional object other than the three-dimensional object recognized as the preceding vehicle among the three-dimensional objects including the moving creature. Thus, the three-dimensional objects to be the target of the contact avoidance may include, for example, the guardrail, the curb, and the sidewall described above.

The determination as to whether the contact predicted object is present may be performed on the basis of the TTC as follows, for example.

That is, a determination may be performed as to whether a three-dimensional object satisfying both of the following conditions is present among the three-dimensional objects corresponding to the "particular kind of three-dimensional object". The conditions may be: a rate of overlap between the three-dimensional object and the vehicle 100 in the lateral direction is a predetermined value or greater; and the TTC is a predetermined threshold or less. If the three-dimensional object satisfying both the above-described conditions is not present, the contact avoidance control processor 14 may obtain a determination result that the contact predicted object is not present.

According to the determination described above, if the number of the three-dimensional objects satisfying both the conditions is one, that three-dimensional object may be determined as the contact predicted object. If the number of the three-dimensional objects satisfying both the conditions is two or more, for example, the three-dimensional object that is the smallest in value of the TTC among those three-dimensional objects may be determined as the contact predicted object.

In a case where the contact predicted object is present, the contact avoidance control processor 14 may perform the AEB for the contact predicted object, and may also perform the AES on an as-needed basis. For example, first, the contact avoidance control processor 14 may start the AEB. If it is determined that the contact is unavoidable by the AEB, the contact avoidance control processor 14 may perform the intervention by steering based on the AES to avoid the contact while continuing the braking based on the AEB.

The vehicle control system 1 may include a brake control unit 20 and a brake-related actuator 21 as configurations to achieve the braking control for the vehicle 100.

The brake control unit 20 may include a microcomputer. The brake control unit 20 may control various actuators provided as the brake-related actuator 21, on the basis of an instruction given by the driving assistance controller 13 including the contact avoidance control processor 14. As the brake-related actuator 21, for example, provided may be various brake-related actuators including, without limitation, a hydraulic control actuator for controlling an output hydraulic pressure from a brake booster to a master cylinder and a hydraulic pressure inside a brake fluid pipe. The brake control unit 20 may control the above-described hydraulic control actuator and thereby perform the braking control for the vehicle 100 on the basis of the instruction given by the driving assistance controller 13.

While the AEB is performed, the contact avoidance control processor 14 may give a braking instruction to the brake control unit 20 and thereby allow braking of the vehicle 100 to be performed.

While the AES is performed, the contact avoidance control processor 14 may calculate a steering angle set to a target, i.e., a target steering angle, on the basis of the image recognition result obtained by the image processor 12. Further, the contact avoidance control processor 14 may supply a steering instruction current value corresponding to the target steering angle to an electric power steering (EPS) control unit 22. The EPS control unit 22 will be described later.

In a case where the "road-side object", such as the guardrail, is recognized in front of the vehicle 100 in the external environment recognition process performed by the image processor 12, the contact avoidance control processor 14 according to the example embodiment may perform a control of delaying the intervention by braking to be performed upon recognizing the road-side object as the contact predicted object. However, this will be described later.

Here, the "road-side object" broadly refers to an object that is present along a side of a road on which the own vehicle travels. Examples of the "road-side object" may include a guardrail, a sidewall, and a curb. The road-side object may be or may not be a single continuous object. That is, the road-side object may encompass an object that is an obstacle train in which obstacles such as poles or traffic pylons are arranged at relatively small intervals.

In this example, the driving assistance controller 13 may also perform various notifications for the driver regarding driving assistance. For example, the driving assistance controller 13 may supply display information and sound output information to the display unit 23 and the sound output unit 24, respectively.

The display unit 23 may comprehensively represent, for example, a display control unit and a display device. The display control unit may include a microcomputer. Examples of the display device may include: various meters including a speed meter and a tachometer in a meter panel provided in front of the driver; a multifunction display (MFD); and any other device to present information to the driver. In terms of the contact avoidance control, the display unit 23 may perform, for example, warning display related to a possibility of contact with an object and display for allowing the driver to perceive an operation state and a stopped state of the AEB and the AES.

The sound output unit 24 may comprehensively represent, for example, a sound output control unit and a sound output device. The sound output control unit may include a microcomputer. The sound output device may include, for example, an amplifier and a speaker. In terms of the contact avoidance control, the sound output unit 24 may output, for example, a warning sound and a notification sound that allows the driver to perceive the operating state and the stopped state of the AEB and the AES.

The EPS control unit 22 may include, for example, a microcomputer. The EPS control unit 22 may control an EPS motor 42 of the steering mechanism 30 on the basis of, for example, the steering instruction current value supplied from the driving assistance controller 13 or the contact avoidance control processor 14 and a detection signal supplied from the steering torque sensor 19.

The EPS control unit 22 may calculate a steering instruction current value for obtaining steering assist torque corresponding to the steering input torque, on the basis of information regarding the steering input torque inputted by the driver. The information regarding the steering input torque inputted by the driver may be acquired from the detection signal supplied from the steering torque sensor 19. Further, the EPS control unit 22 may drive the EPS motor 42 on the basis of the calculated steering instruction current value. A power steering control for assisting the driver's steering may be thus performed.

Note that the driver may be able to perform a steering operation also during execution of the steering control by the contact avoidance control processor 14. However, in such a case where manual steering is performed during the execution of the steering control, the EPS control unit 22 may add the steering instruction current value supplied from the contact avoidance control processor 14 and the steering instruction current value for the power steering control calculated as above, and drive the EPS motor 42 on the basis of the obtained sum total of the steering instruction current values.

The steering mechanism 30 to be controlled by the steering control may have the following configuration, for example.

The steering mechanism 30 may include a steering shaft 32 rotatably supported by an unillustrated vehicle body frame via a steering column 33. The steering shaft 32 may have a first end extending toward a driver's seat. A steering wheel 34 may be attached to the first end of the steering shaft 32. The steering shaft 32 may have a second end to which a pinion shaft 35 is coupled.

The pinion shaft 35 may include an unillustrated pinion that is meshed with a rack provided at a rack shaft 37. The rack shaft 37 may be inserted into a steering gear box 36 and reciprocatably supported by the steering gear box 36. A rack-and-pinion steering gear mechanism may be thus provided.

Left and right ends of the rack shaft 37 may protrude from the steering gear box 36, and a tie rod 38 may be coupled to each of the left and right ends. A front knuckle 39 may be coupled to an end of each of the tie rods 38 opposite to an end coupled to the rack shaft 37. The front knuckles 39 may each support corresponding wheel 40 of the left wheel 40L and the right wheel 40R. The front knuckles 39 may each be supported by the vehicle body frame via an unillustrated kingpin. The front knuckles 39 may each be coupled to the end of the corresponding tie rod 38 in such a manner that the front knuckle 39 is pivotable about the kingpin.

Accordingly, when the steering wheel 34 is operated to rotate the steering shaft 32 and the pinion shaft 35, the rotation of the pinion shaft 35 may move the rack shaft 37 in the left-right direction. The movement of the rack shaft 37 may cause the front knuckles 39 to pivot about the respective kingpins to turn the left wheel 40L and the right wheel 40R in the left-right direction.

The EPS motor 42 may be coupled to the pinion shaft 35 via an assist transmission mechanism 41. The EPS motor 42 may allow assistance by the steering torque applied to the steering wheel 34 and addition of steering torque to achieve a target steering angle θs.

As described above, in a case where the contact predicted object is detected, the vehicle control system 1 according to the example embodiment may perform the control based on the AEB, and if avoidance of contact is determined as not being possible by performing braking of the vehicle 100 based on the AEB, the vehicle control system 1 may perform the intervention by steering based on the AES.

For confirmation, a process example of such a contact avoidance control is described below with reference to a flowchart illustrated in FIG. 3.

Figure 3:
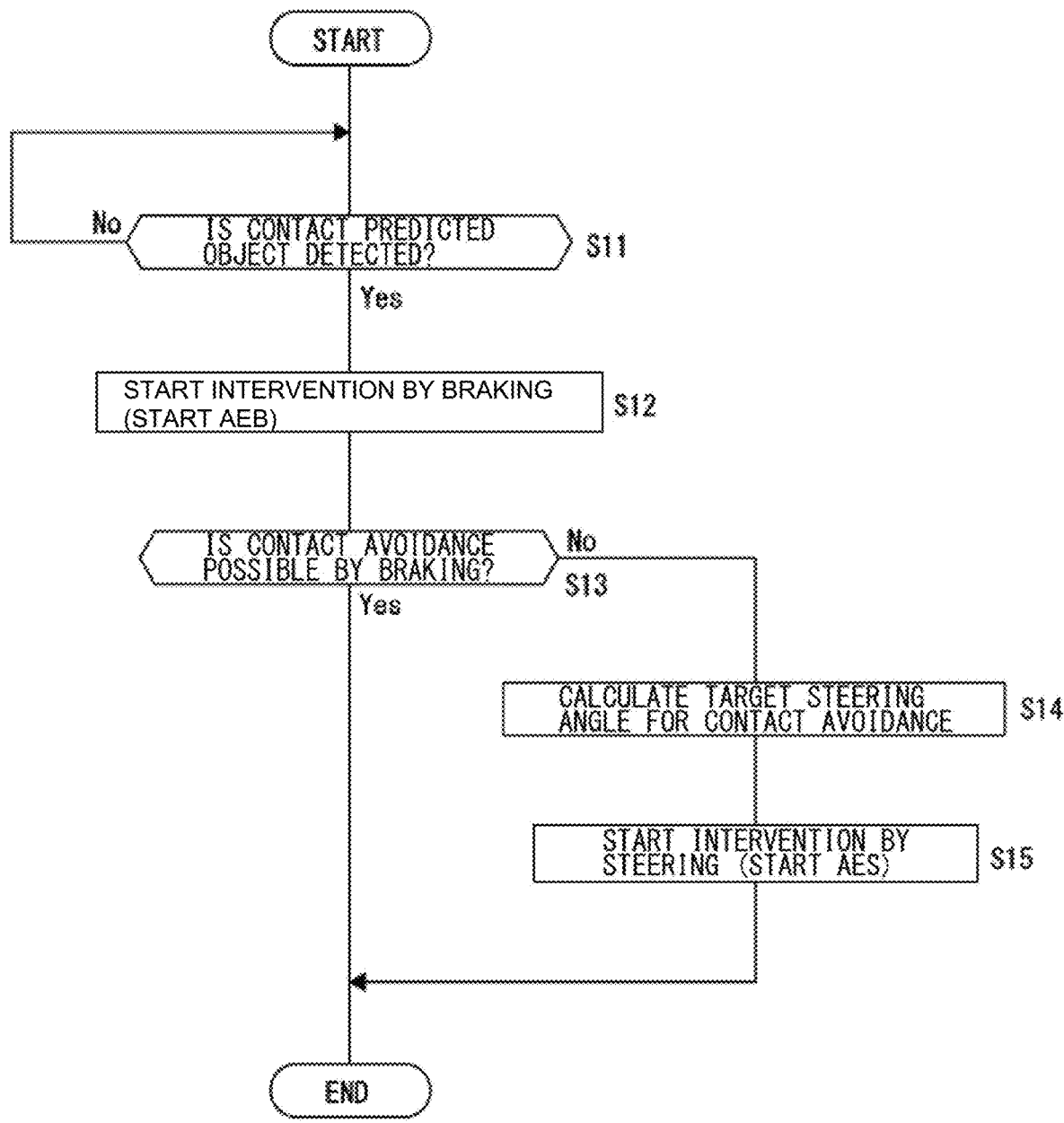
FIG. 3 is a flowchart illustrating a process example of a contact avoidance control.

As illustrated in FIG. 3, first, in step S11, the contact avoidance control processor 14 may determine whether the contact predicted object is detected. That is, by the above-described method, the contact avoidance control processor 14 may determine whether the three-dimensional object that satisfies both the condition related to the overlap rate and the condition related to the TTC above is present among the three-dimensional objects recognized by the image processor 12. If the three-dimensional object that satisfies both the conditions is present, the contact avoidance control processor 14 may obtain a determination result that the contact predicted object is detected. Note that if two or more three-dimensional objects that satisfy both the conditions are present, the contact avoidance control processor 14 may determine one of such three-dimensional objects as the contact predicted object on the basis of the values of the TTC, as described above. If the contact predicted object is determined as being detected (step S11: Yes), the contact avoidance control processor 14 may cause the process to proceed to step S12. If the contact predicted object is determined as not being detected (step S11: No), the contact avoidance control processor 14 may cause the process to return to step S11 and wait until the contact predicted object is detected.

In step S12 after step S11, the contact avoidance control processor 14 may start the intervention by braking. That is, the contact avoidance control processor 14 may start a control based on the AEB. For example, the contact avoidance control processor 14 may give an instruction to the brake control unit 20 and thereby start braking of the vehicle 100 based on the AEB.

In step S13 after step S12, the contact avoidance control processor 14 may determine whether the contact avoidance is possible by braking. This determination process may be performed, for example, by a publicly known method. For example, the determination process may be performed on the basis of: the current vertical relative speed vrz related to the contact predicted object; and map information indicating the TTC value which allows for contact avoidance, corresponding to each vertical relative speed vrz.

If the contact avoidance is determined as being possible by braking in step S13 (step S13: Yes), the contact avoidance control processor 14 may end the series of processes illustrated in FIG. 3. That is, in this case, the contact avoidance may be attempted by the AEB.

If the contact avoidance is determined as not being possible by braking in step S13 (step S13: No), the contact avoidance control processor 14 may cause the process to proceed to step S14. In step S14, the contact avoidance control processor 14 may calculate the target steering angle for the contact avoidance. That is, the contact avoidance control processor 14 may calculate the target steering angle to avoid contact with the object recognized as the contact predicted object.

After calculating the target steering angle in step S14, the contact avoidance control processor 14 may cause the process to proceed to step S15. In step S15, the contact avoidance control processor 14 may start the intervention by steering. That is, the contact avoidance control processor 14 may start a control based on the AES. For example, the contact avoidance control processor 14 may give an instruction to the EPS control unit 22 regarding the target steering angle for the contact avoidance, and thereby start the intervention by steering for the contact avoidance.

After performing the process of starting the intervention by steering in step S15, the contact avoidance control processor 14 may end the series of processes illustrated in FIG. 13.

As described above, the contact avoidance control may be performed as follows: 1) determine whether the contact predicted object is present on the basis of the TTC related to the vertical direction and the overlap rate related to the lateral direction; 2) determine whether the avoidance of the contact predicted object is possible by braking (AEB); 3) start the AEB if the avoidance is possible by braking; and 4) start avoidance also using steering, i.e., start the AES, if the avoidance is not possible by braking.

Here, assume a case where the target object of the contact avoidance is the road-side object such as the guardrail. The road-side object is usually recognized as the contact predicted object not on a straight road but on a curved road in which the overlap rate related to the road-side object is high in some degree.

In this case, if the curve is relatively gentle and an angle of the road-side object with respect to the own vehicle traveling direction is small, the process of recognizing the road-side object may be classified into two cases: a case where the entire road-side object is recognizable; and a case where a portion near an end of the road-side object closer to the own vehicle is recognizable but the road-side object is not entirely recognizable.

In the case where the entire road-side object is recognizable, the entire road-side object may be subjected to the determination regarding the contact predicted object. In this case, the overlap rate related to the road-side object may be great. Therefore, the road-side object may be easily determined as the contact predicted object even in a stage where the own vehicle still has a considerable distance to the road-side object. That is, the AEB may be started before the driver recognizes a possibility of a danger, which can give a feeling of strangeness to the driver.

In the case where the portion near the end of the road-side object closer to the own vehicle is recognizable but the road-side object is not entirely recognizable, the overlap rate may be small. Therefore, a timing of recognizing the road-side object as the contact predicted object may be later as compared with a case where the entire road-side object is recognized. Accordingly, this case may have a low possibility that the starting of the AEB gives the above-described feeling of strangeness to the driver.

In the example embodiment, in order to reduce the above-described feeling of strangeness given to the driver, a determination may be performed as to whether avoidance of the contact with the road-side object is possible by performing a braking control also using steering. If the avoidance of the contact with the road-side object is possible by performing such a control, a control of delaying the intervention by braking for the contact avoidance in which the road-side object is set to the target object may be performed. In other word, the timing may be delayed regarding the intervention by braking for the contact avoidance targeting the road-side object in a case where the road-side object is detected as the contact predicted object.

This helps to reduce the feeling of strangeness given to the driver while allowing for the avoidance of the contact with the road-side object.

Figure 4:
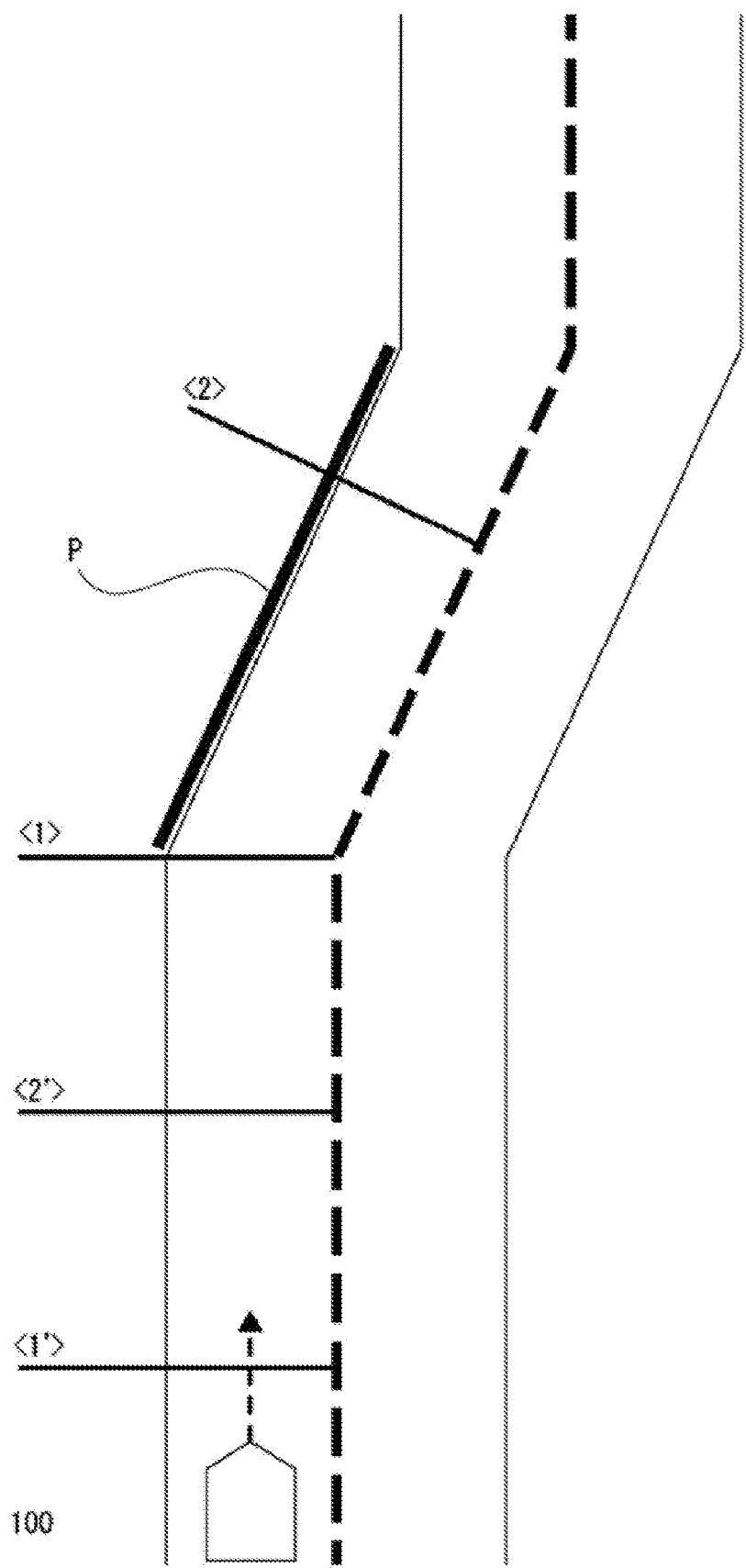
FIG. 4 is an explanatory diagram illustrating behavior of the vehicle in a case where intervention by braking is delayed and in a case where the intervention by braking is not delayed.

For confirmation, with reference to FIG. 4, a description is given of behavior of the vehicle 100 in the contact avoidance control for the case where the intervention by braking is delayed as described above and for a case where the intervention by braking is not delayed.

In the following, the road-side object recognized on a traveling direction side of the vehicle 100 is referred to as a "road-side object P".

In FIG. 4, a position indicated by <1'> is a position or a timing to start the intervention by braking based on the AEB, in a case where the road-side object P is detected as the contact predicted object. A position indicated by <1> is a position or a timing where the vehicle 100 is to stop in a case where the contact avoidance is performed by the AEB.

In such contact avoidance based on the AEB, in order to reduce the feeling of strangeness given to the driver, a timing of the intervention by braking may be delayed. In FIG. 4, <2'> indicates a timing of the intervention by braking that is delayed from the timing of the intervention by braking indicated by <1'>.

To determine whether the timing of the intervention by braking is to be delayed, a determination may be performed as to whether the avoidance of the contact with the road-side object is possible in a case where the braking control also using steering is performed on the basis of an assumption that the intervention by braking is started from the position <2'>.

In FIG. 4, <2> indicates a position where the vehicle 100 is to stop in such a case where the intervention by braking is started at the position <2'> and the contact avoidance using both braking and steering is performed.

In addition to the above-described control of delaying the intervention by braking, the example embodiment proposes a method to prevent the vehicle 100 from stopping in a dangerous place in a case where the vehicle 100 is stopped by the contact avoidance control.

Figure 5:
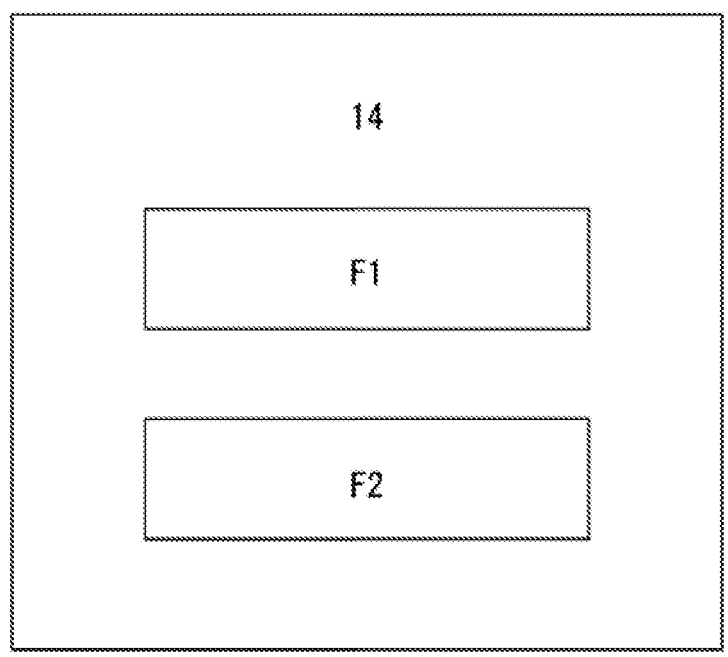
FIG. 5 is a block diagram illustrating a configuration example of a contact avoidance control processor.

FIG. 5 is a block diagram illustrating a configuration example of the contact avoidance control processor 14.

As illustrated in FIG. 5, the contact avoidance control processor 14 may include a braking delay process unit F1 and a stopping control process unit F2.

The braking delay process unit F1 may perform the above-described control of delaying the intervention by braking. That is, the braking delay process unit F1 may perform the control of delaying the intervention by braking in a case where the contact avoidance using both braking and steering is predicted to be possible as contact avoidance in which the road-side object P is set to the target object, as compared with a case where the contact avoidance using braking is performed.

Here, the wording "contact avoidance using both braking and steering is possible" is related to the intervention by braking for the contact avoidance in which the road-side object P is set to the target object, and means that avoidance of the contact with the road-side object P is possible in a case where the timing of the intervention is delayed.

In this example, a prediction or a determination as to whether the contact avoidance using both braking and steering is possible may be performed with use of information regarding an angle of the road-side object P with respect to the own vehicle traveling direction, information regarding the own vehicle speed v, information regarding own vehicle turning performance, and information regarding a coefficient of friction on a road. The information regarding the own vehicle turning performance described here may be information indicating, for each traveling speed, the degree of R (radius of curvature) of the curve that allows the vehicle 100 to travel through the curve without spinning or the like. The information regarding the own vehicle turning performance may be stored in a predetermined storage that is readable by the contact avoidance control processor 14, such as the ROM of the contact avoidance control processor 14. The coefficient of friction on a road may be calculated, for example, by the external environment recognition process performed by the image processor 12. For example, the coefficient of friction on a road may be calculated on the basis of a result of image analysis regarding a road surface situation based on an image captured by the imaging unit 10.

With use of the above-described pieces of information regarding the own vehicle v, the angle of the road-side object P, the own vehicle turning performance, and the coefficient of friction on a road, a determination may be performed as to whether the vehicle 100 is able to avoid the road-side object P without spinning or the like in a case where the intervention by braking for the contact avoidance is delayed and the contact avoidance also using steering is performed. In other words, a determination may be performed as to whether the vehicle 100 is able to travel through the curved road ahead of the vehicle 100 where the road-side object P is present in such a case.

In this example, a determination may be performed as to whether the vehicle 100 is able to travel in parallel with the road-side object P. Here, the wording "is able to travel in parallel with the road-side object P" means that the vehicle 100 is able to stably travel along the road-side object without slipping or the like, due to the intervention by both braking and steering. Here, the wording "in parallel with" does not necessarily mean being strictly parallel with the road-side object P. The wording "in parallel with" thus allows some degree of deviation and encompasses being substantially parallel.

As can be seen from the contact avoidance control process illustrated in FIG. 3, if the intervention by braking based on the AEB is delayed, it is possible to allow for execution of the contact avoidance also using steering as the contact avoidance. For example, if the intervention by braking based on the AEB is delayed, it is possible to allow for obtainment, in step S13, of a determination result that the avoidance is not possible by braking. As a result, it is possible to allow for execution of the contact avoidance control using both braking and steering as the contact avoidance control.

In FIG. 5, in a case where the braking delay process unit F1 delays the intervention by braking, if a discontinuous portion Pa of the road-side object P is recognized and the vehicle 100 is predicted to stop within a section corresponding to the discontinuous portion Pa on the own vehicle traveling lane, the stopping control process unit F2 may perform a control of preventing the vehicle 100 from stopping within the section corresponding to the discontinuous portion Pa.

For example, the stopping control process unit F2 in this example may perform a control of causing the vehicle 100 to stop on a farther side of the section corresponding to the discontinuous portion Pa, by adjusting deceleration of the vehicle 100. Here, the "farther side" refers to a farther side from a viewpoint of the traveling vehicle 100, in other words, corresponds to the traveling direction side of the vehicle 100.

Figure 6:
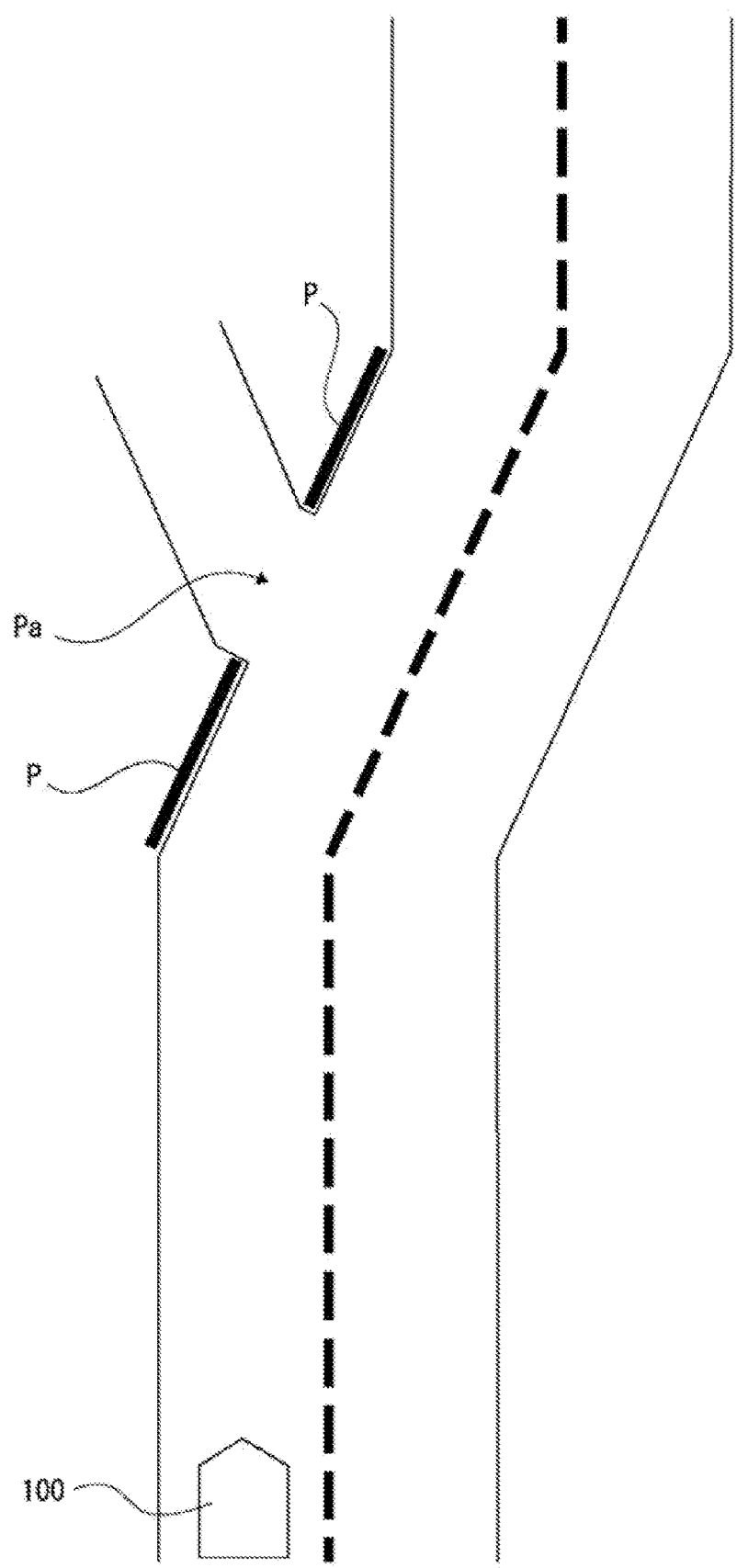
FIG. 6 is an explanatory diagram illustrating a discontinuous portion of a road-side object.
Figure 7:
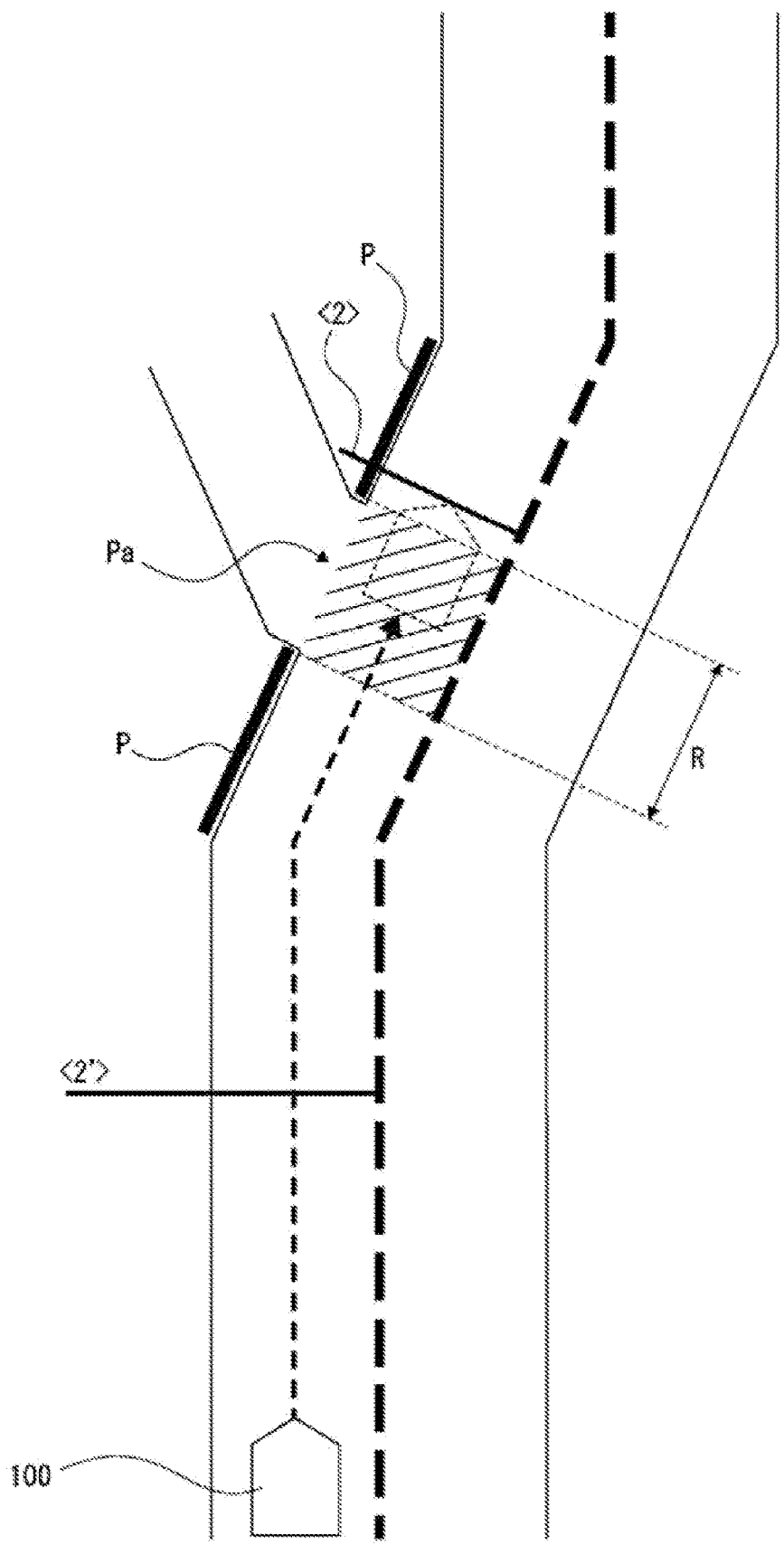
FIG. 7 is an explanatory diagram illustrating a control of preventing the vehicle from stopping within a section corresponding to the discontinuous portion.

FIG. 6 is an explanatory diagram illustrating the discontinuous portion Pa of the road-side object P. FIG. 7 is an explanatory diagram illustrating a control of preventing the vehicle 100 from stopping within the section corresponding to the discontinuous portion Pa.

In FIG. 6, it is assumed that the discontinuous portion Pa may be, for example: an entrance to a road branching from the road on which the vehicle 100 is traveling, i.e., from the own vehicle traveling road; or an entrance to a roadside evacuation region or a facility such as a store present along the own vehicle traveling road.

The discontinuous portion Pa may have a width that is definable as a width that allows an object to enter the own vehicle traveling road through the discontinuous portion Pa. That is, it may be assumed that the width of the discontinuous portion Pa is greater than or equal to a width of an object that may enter the own vehicle traveling road, such as an automobile, a motorcycle, or a pedestrian. In a case where a length of the interval in the road-side object P is greater than or equal to a length assumed to be the width of the above-described object, the length of the interval in the road-side object P may be detected as the width of the discontinuous portion Pa.

A section R illustrated in FIG. 7 indicates the section corresponding to the discontinuous portion Pa on the own vehicle traveling lane.

FIG. 7 illustrates a situation in which the vehicle 100 is predicted to stop within the section R in a case where the intervention by braking is delayed and the contact avoidance using both braking and steering is performed.

In such a case, the stopping control process unit F2 may adjust the deceleration of the vehicle 100 during the contact avoidance control and thereby stop the vehicle 100 on the farther side of the section corresponding to the discontinuous portion Pa.

In this example, the contact avoidance control processor 14 may predict or determine whether the vehicle 100 is to stop within the section R in a case where the intervention by braking is delayed and the contact avoidance, related to the road-side object P, using both braking and steering is performed. If the vehicle 100 is predicted to stop within the section R, the contact avoidance control processor 14 may not execute the control of delaying the intervention by braking.

Accordingly, if the vehicle 100 is determined as being to stop within the section R, the intervention by braking may be started at the position <1'> as usual. Therefore, the vehicle 100 may be stopped at the position <1> by the AEB. That is, it is possible to prevent the vehicle 100 from stopping within the section corresponding to the discontinuous portion Pa.

As described above, in this example, a determination may be performed as to whether the vehicle 100 is predicted to stop within the section R if the intervention by braking is delayed. If an affirmative result is obtained by the determination, the control of delaying the timing of the intervention by braking may not be performed. In the above-described point also, this example makes it possible to prevent the vehicle 100 from stopping within the section R.

In this example, even in a case where the contact avoidance using both braking and steering is predicted to be possible as the contact avoidance in which the road-side object P is set to the target object, if the vehicle 100 is predicted to deviate from the own vehicle traveling lane upon being stopped by the contact avoidance, the braking delay process unit F1 may not perform the control of delaying the intervention by braking.

Figure 8:
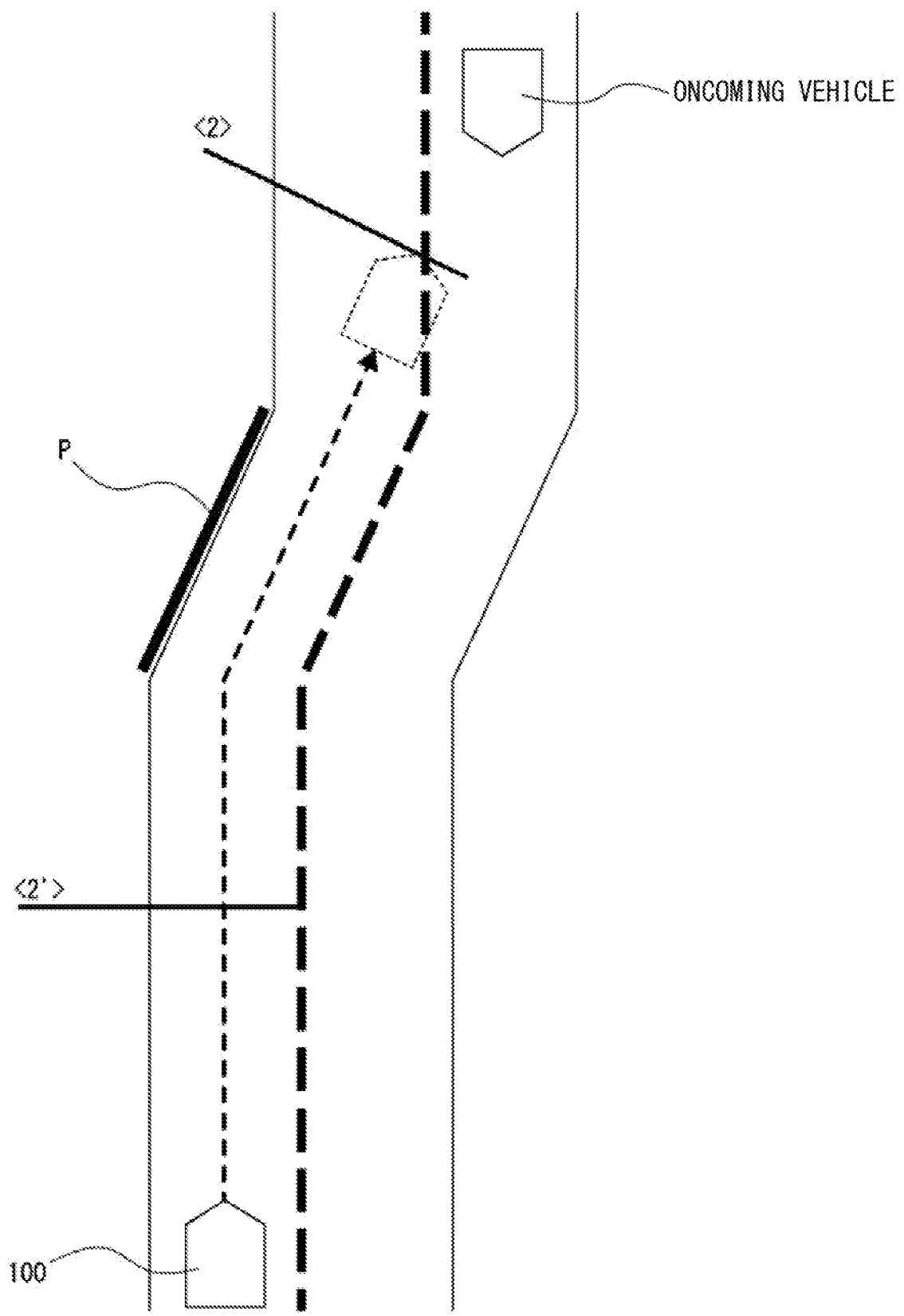
FIG. 8 is an explanatory diagram illustrating an example in which the vehicle stopped by the contact avoidance control deviates from an own vehicle traveling lane.

That is, as exemplified in FIG. 8, even in a case where the intervention by braking is delayed to allow for execution of the contact avoidance, related to the road-side object P, using both braking and steering and where the contact avoidance is predicted to be possible on the basis of the above-described pieces of information regarding, for example, the own vehicle speed v, the own vehicle turning performance, and the coefficient of friction on a road, if the vehicle 100 is predicted to deviate from the own vehicle traveling lane upon being stopped by the contact avoidance (see the position <2> in FIG. 8), the control of delaying the intervention by braking may not be performed.

This helps to make it possible to prevent the stopped vehicle 100 from being involved in a dangerous situation, such as contact with an oncoming vehicle, after the execution of the contact avoidance related to the road-side object P. Accordingly, it is possible to improve safety.

In addition, in this example, the braking delay process unit F1 may determine whether to delay the intervention by braking on the basis of situation prediction information regarding an external object other than the road-side object P in an avoidance control execution scheduled period in a case where the contact avoidance using both braking and steering is performed as the contact avoidance in which the road-side object P is set to the target object.

In this example, for example, the braking delay process unit F1 may determine whether entry of an object to the own vehicle traveling lane is predicted in the avoidance control execution scheduled period. If such entry of the object is predicted, the braking delay process unit F1 may not perform the control of delaying the intervention by braking.

In addition, the braking delay process unit F1 may determine whether the vehicle 100 is predicted to pass an oncoming vehicle in the avoidance control execution scheduled period. If the vehicle 100 is predicted to pass an oncoming vehicle, the braking delay process unit F1 may not perform the control of delaying the intervention by braking.

Thus, for example, the intervention by braking may not be delayed if, for example, the following situations are predicted: a situation in which an external object such as a pedestrian is to enter the own vehicle traveling lane in the avoidance control execution scheduled period; and a situation in which the vehicle 100 is to pass the oncoming vehicle in the avoidance control execution scheduled period. That is, in a case where a situation involving a concern regarding a possibility of contact with the external object is predicted, it is possible not to perform the control of delaying the intervention by braking. In other words, it is possible to secure the avoidance of the contact with the road-side object P by the AEB.

Figure 9:
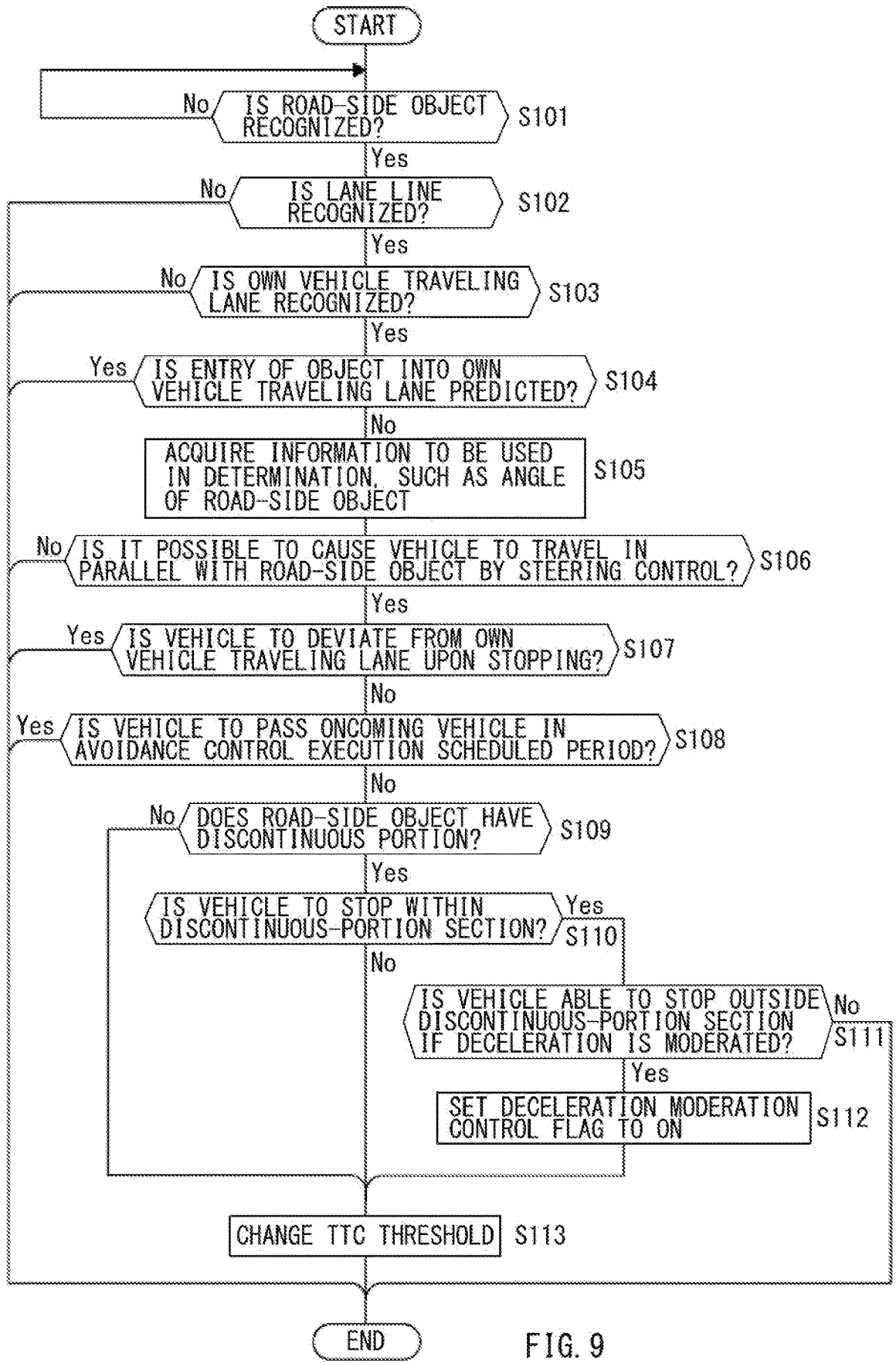
FIG. 9 is a flowchart illustrating an example of a process procedure for achieving a braking and steering control according to the example embodiment.

Referring to a flowchart illustrated in FIG. 9, a description is given of an example of a process procedure for achieving the braking and steering control according to the example embodiment described above.

The process illustrated in FIG. 9 may be executed by the CPU of the contact avoidance control processor 14, for example, in accordance with a program stored in a storage such as the ROM included in the contact avoidance control processor 14.

First, in step S101, the contact avoidance control processor 14 may determine whether the road-side object P is recognized by the image processor 12. If the road-side object P is determined as not being recognized (step S101: No), the contact avoidance control processor 14 may cause the process to return to step S101 and wait until the road-side object P is recognized. That is, the contact avoidance control processor 14 may wait until the image processor 12 recognizes the road-side object P in front of the vehicle 100.

If the road-side object P is determined as being recognized (step S101: Yes), in step S102, the contact avoidance control processor 14 may determine whether the lane line is recognized. That is, the contact avoidance control processor 14 may determine whether the lane line of the own vehicle traveling lane is recognized by the image processor 12.

If the lane line is not recognized (step S102: No), the contact avoidance control processor 14 may end the series of processes illustrated in FIG. 9. That is, if the lane line is not recognized, the control of delaying the intervention by braking in step S113 may not be performed.

If the lane line is recognized (step S102: Yes), in step S103, the contact avoidance control processor 14 may determine whether the own vehicle traveling lane is recognized. If the own vehicle traveling lane is not recognized (step S103: No), the contact avoidance control processor 14 may end the series of processes illustrated in FIG. 9. That is, the control of delaying the intervention by braking may not be performed also in a case where the own vehicle traveling lane is not recognized.

If the own vehicle traveling lane is recognized (step S103: Yes), in step S104, the contact avoidance control processor 14 may determine whether entry of an object into the own vehicle traveling lane is predicted. That is, the contact avoidance control processor 14 may determine whether entry of an object into the own vehicle traveling lane is predicted in the avoidance control execution scheduled period in a case where the intervention by braking is delayed to perform the contact avoidance, related to the road-side object P, using both braking and steering. This determination may be performed with use of pieces of information regarding a position in the lateral direction and a moving state of a moving object recognized as the external object, such as a pedestrian or another vehicle. Such pieces of information may include, for example, pieces of information regarding a three-dimensional object lateral distance dx, a lateral relative speed vrx, a lateral speed vx, and a lateral acceleration ax related to the moving object.

If the entry of an object into the own vehicle traveling lane is predicted (step S104: Yes), the contact avoidance control processor 14 may end the series of processes illustrated in FIG. 9.

If the entry of an object into the own vehicle traveling lane is not predicted (step S104: No), in step S105, the contact avoidance control processor 14 may perform a process of acquiring information to be used in a determination, such as the information regarding the angle of the road-side object P. For example, the contact avoidance control processor 14 may acquire the information regarding the angle of the road-side object P with respect to the own vehicle traveling direction, the information regarding the own vehicle speed v, the information regarding the own vehicle turning performance, and the information regarding the coefficient of friction on a road that are described above.

In step S106 after step S105, the contact avoidance control processor 14 may determine whether it is possible to cause the vehicle 100 to travel in parallel with the road-side object P by a steering control. For example, on the basis of the pieces of information acquired in step S105 regarding the angle, the own vehicle speed v, the own vehicle turning performance, and the coefficient of friction on a road, the contact avoidance control processor 14 may determine whether it is possible to cause the vehicle 100 to travel in parallel with the road-side object P in a case where the intervention by braking for the contact avoidance is performed and the contact avoidance also using steering is performed.

Note that a description is not given of the determination as to whether it is possible to cause the vehicle 100 to travel in parallel with the road-side object P, as it is already described above.

If it is determined that it is not possible to cause the vehicle 100 to travel in parallel with the road-side object P by the steering control (step S106: No), the contact avoidance control processor 14 may end the series of processes illustrated in FIG. 9.

That is, the control of delaying the intervention by braking may not be performed if the avoidance of the contact with the road-side object P is predicted not to be possible in a case where the intervention by braking for the contact avoidance is delayed and the contact avoidance also using steering is performed.

If it is determined that it is possible to cause the vehicle 100 to travel in parallel with the road-side object P (step S106: Yes), in step S107, the contact avoidance control processor 14 may determine whether the vehicle 100 is to deviate from the own vehicle traveling lane upon stopping. That is, the contact avoidance control processor 14 may determine whether the vehicle 100 is predicted to deviate from the own vehicle traveling lane upon stopping in the case where the intervention by braking for the contact avoidance is delayed and the contact avoidance also using steering is performed.

If the vehicle 100 is determined as being to deviate from the own vehicle traveling lane upon stopping in step S107 (step S107: Yes), the contact avoidance control processor 14 may end the series of processes illustrated in FIG. 9. That is, the control of delaying the intervention by braking may not be performed.

If the vehicle 100 is determined as not being to deviate from the own vehicle traveling lane upon stopping (step S107: No), in step S108, the contact avoidance control processor 14 may determine whether the vehicle 100 is to pass an oncoming vehicle in the avoidance control execution scheduled period. That is, the contact avoidance control processor 14 may determine whether the vehicle 100 is to pass an oncoming vehicle in the avoidance control execution scheduled period in the case where the intervention by braking for the contact avoidance is delayed and the contact avoidance also using steering is performed.

If the vehicle 100 is determined as being to pass an oncoming vehicle in the avoidance control execution scheduled period (step S108: Yes), the contact avoidance control processor 14 may end the series of processes illustrated in FIG. 9.

That is, the control of delaying the intervention by braking may not be performed if the vehicle 100 is predicted to pass an oncoming vehicle in the avoidance control execution scheduled period in the case where the intervention by braking for the contact avoidance is delayed and the contact avoidance also using steering is performed.

If the vehicle 100 is determined as not being to pass an oncoming vehicle in the avoidance control execution scheduled period (step S108: No), the contact avoidance control processor 14 may cause the process to proceed to step S109. In step S109, the contact avoidance control processor 14 may determine whether the road-side object P has the discontinuous portion Pa.

If the road-side object P is determined as not having the discontinuous portion Pa (S109: No), the contact avoidance control processor 14 may cause the process to proceed to step S113. In step S113, the contact avoidance control processor 14 may change a TTC threshold. For example, the contact avoidance control processor 14 may perform a process of decreasing the TTC threshold. Thus, if the road-side object P does not have the discontinuous portion Pa, the control of delaying the intervention by braking may be performed. Accordingly, the feeling of strangeness given to the driver is reduced.

The following description is given for confirmation. If the TTC threshold is decreased, the TTC does not become the TTC threshold or less unless the vehicle 100 moves closer to the road-side object P. That is, the road-side object P is prevented from being determined as the contact predicted object. It is thus possible to delay the timing of the intervention by braking.

If the road-side object P is determined as having the discontinuous portion Pa (S109: Yes), the contact avoidance control processor 14 may cause the process to proceed to step S110. In step S110, the contact avoidance control processor 14 may determine whether the vehicle 100 is to stop within the section corresponding to the discontinuous portion Pa, i.e., a discontinuous-portion section. That is, the contact avoidance control processor 14 may determine whether the vehicle 100 is predicted to stop within the section R in the case where the intervention by braking for the contact avoidance is delayed and the contact avoidance also using steering is performed.

If the vehicle 100 is determined as not being to stop within the discontinuous-portion section (step S110: No), the contact avoidance control processor 14 may cause the process to proceed to step S113. Thus, if the road-side object P has the discontinuous portion Pa but the vehicle 100 is predicted not to stop within the section R corresponding to the discontinuous portion Pa in the case where the contact avoidance also using steering is performed, the control of delaying the intervention by braking may be performed. Accordingly, the feeling of strangeness given to the driver is reduced.

If the vehicle 100 is determined as being to stop within the discontinuous-portion section (step S110: Yes), the contact avoidance control processor 14 may cause the process to proceed to step S111. In step S111, the contact avoidance control processor 14 may determine whether the vehicle 100 is able to stop outside the discontinuous-portion section if the deceleration is moderated. That is, the contact avoidance control processor 14 may determine whether the vehicle 100 is able to stop outside the section R, i.e., on the farther side of the section R, if the deceleration of the vehicle 100 is moderated during the contact avoidance control in the case where the intervention by braking for the contact avoidance is delayed and the contact avoidance also using steering is performed.

This determination may be performed as follows. Regarding the contact avoidance control also using steering, a position where the vehicle 100 is to stop, i.e., a stopping position of the vehicle 100, may be estimated for control patterns that are different in the deceleration during the control. Further, a determination may be performed as to whether a control pattern that allows the stopping position of the vehicle 100 to be on the farther side of the section R is present among those control patterns.

On this occasion, the section R may be identified on the basis of a distance (a vertical distance) to a portion of the discontinuous portion Pa on a closer side and a distance (a vertical distance) to a portion of the discontinuous portion Pa on the farther side.

If the condition that the vehicle 100 is able to stop outside the discontinuous-portion section in a case where the deceleration is moderated is determined as not being satisfied (step S111: No), the contact avoidance control processor 14 may end the series of processes illustrated in FIG. 9. That is, the control of delaying the intervention by braking may not be performed in a case where the vehicle 100 is predicted to stop within the section R even if the deceleration is moderated.

If the vehicle 100 is determined as being able to stop outside the discontinuous-portion section in the case where the deceleration is moderated (step S111: Yes), the contact avoidance control processor 14 may cause the process to proceed to step S112. In step S112, the contact avoidance control processor 14 may perform a process of setting a deceleration moderation control flag to ON. Thereafter, the contact avoidance control processor 14 may cause the process to proceed to step S113.

The deceleration moderation control flag may indicate whether the deceleration is to be moderated in the contact avoidance control using both braking and steering in the case where the control of delaying the intervention by braking is performed in the process in step S113. If the deceleration moderation control flag is ON, the contact avoidance control processor 14 may perform a control of moderating the deceleration of the vehicle 100 in the contact avoidance control. For example, the contact avoidance control processor 14 may decelerate the vehicle 100 at deceleration set in the control pattern that has been determined as the control pattern allowing the stopping position of the vehicle 100 to be outside the section R among the control patterns used in the process in the earlier step S110. It is thus possible to stop the vehicle 100 outside the section R in the case where the intervention by braking is delayed.

After performing the process of changing the threshold in step S113, the contact avoidance control processor 14 may end the series of processes illustrated in FIG. 9.

Figure 10:
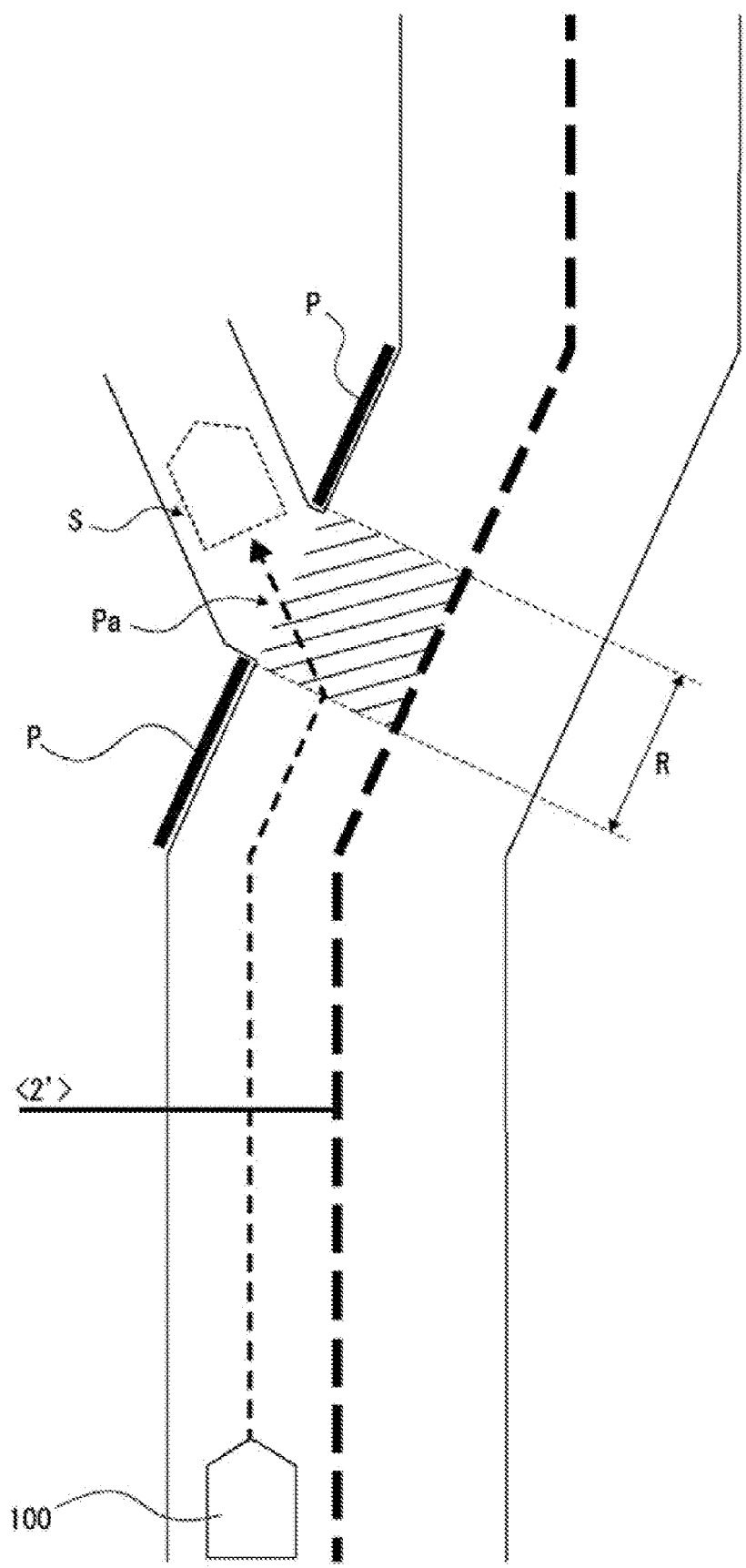
FIG. 10 is an explanatory diagram illustrating an alternative example in which the vehicle is stopped in a space that has the discontinuous portion of the road-side object as an opening.

In a case where the road-side object P has the discontinuous portion Pa, another possible way to prevent the vehicle 100 from stopping within the section R may be to stop the vehicle 100 within a space S that has the discontinuous portion Pa as an opening, as exemplified in FIG. 10. The space S may be, in other words, a space located behind the discontinuous portion Pa.

Figure 11:
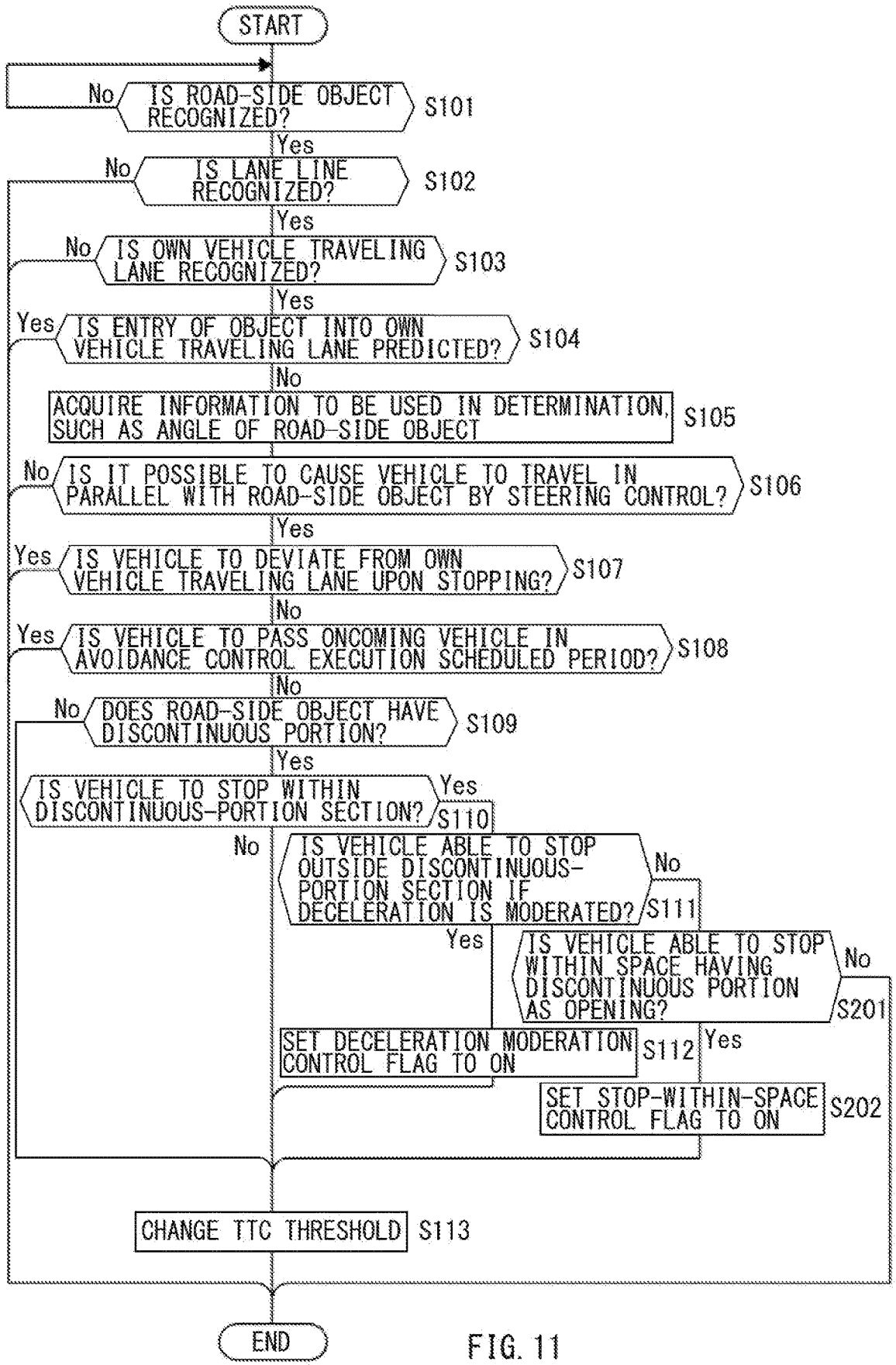
FIG. 11 is a flowchart illustrating an example of the process procedure for achieving the braking and steering control as an alternative example.

FIG. 11 is a flowchart illustrating an example of a process procedure for achieving the braking and steering control as another example in which the vehicle 100 is stopped within the space S as described above.

Regarding the flowchart illustrated in FIG. 11, a process similar to the process already described with reference to FIG. 9 is denoted with the same step number and a detailed description thereof is omitted here.

As compared with the process illustrated in FIG. 9, the process in FIG. 11 may additionally include step S201 and step S202.

In this case, if the vehicle 100 is determined in step S111 as not being able to stop outside the section R even if the deceleration is moderated (step S111: No), the contact avoidance control processor 14 may cause the process to proceed to step S201.

In step S201, the contact avoidance control processor 14 may determine whether the vehicle 100 is able to stop within the space S having the discontinuous portion Pa as an opening. In this example, a determination as to whether the vehicle 100 is able to stop within the space S may be performed as a determination as to whether all of the following conditions are satisfied.

Condition (1): A road sign prohibiting entry into the space S is not present near the discontinuous portion Pa. Examples of such a road sign may include a road sign that indicates one-way traffic and a road sign that prohibits entry of vehicles.

Condition (2): The discontinuous portion Pa has a width that allows for entry of the vehicle 100.

Condition (3): The vehicle 100 is able to enter the space S taking into consideration the estimated speed of the vehicle 100 during the contact avoidance control.

Regarding Condition (1), a determination may be performed on the basis of a result of the recognition process performed on the external object outside the vehicle 100 by the image processor 12.

Regarding Condition (2), for example, the width of the discontinuous portion Pa may be estimated on the basis of the distance to the portion of the discontinuous portion Pa on the closer side and the distance to the portion of the discontinuous portion Pa on the farther side. Further, a determination regarding Condition (2) may be performed on the basis of the estimated width and the width of the vehicle 100.

Regarding Condition (3), for example, an estimation may be performed regarding the own vehicle speed v of the vehicle 100 immediately before entering the space S in the case where the intervention by braking for the contact avoidance is delayed and the contact avoidance also using steering is performed. Further, a determination may be performed as to whether the vehicle 100 is able to stably enter the space S without slipping or the like on the basis of, for example, the estimated own vehicle speed v, the above-described information regarding the own vehicle turning performance, the information regarding an angle to enter the space S from the own vehicle traveling lane.

Note that regarding Condition (3), in one example, the determination may be performed on the basis of the deceleration of the vehicle 100 to be performed for the vehicle 100 to enter the space S.

In step S201, if the vehicle 100 is determined as not being able to stop within the space S (step S201: No), the contact avoidance control processor 14 may end the series of processes illustrated in FIG. 11. That is, in the case where the vehicle 100 is predicted to stop within the section R corresponding to the discontinuous portion Pa (step S110: Yes), where the vehicle 100 is predicted as not being able to stop outside the section R even if the deceleration is moderated (step S111: No), and where the vehicle 100 is predicted as not being able to enter the space S (step S201: No), the control of delaying the intervention by braking (step S113) may not be performed.

If the vehicle 100 is determined as being able to stop within the space S (step S201: Yes), the contact avoidance control processor 14 may cause the process to proceed to step S202. In step S202, the contact avoidance control processor 14 may set a stop-within-space control flag to ON. Thereafter, the contact avoidance control processor 14 may cause the process to proceed to step S113.

The stop-within-space control flag may indicate whether to stop the vehicle 100 within the space S in the contact avoidance control using both braking and steering in the case where the control of delaying the intervention by braking is performed in step S113. If the stop-within-space control flag is ON, the contact avoidance control processor 14 may perform a control of stopping the vehicle 100 within the space S in the contact avoidance control.

Thus, even in a case where the intervention by braking is delayed and where the vehicle 100 is predicted as not being able to stop outside the section R even if the deceleration is moderated, the vehicle 100 may be caused to enter the space S and stop therein, which makes it possible to prevent the vehicle 100 from stopping within the section R.

An embodiment of the disclosure is not limited to the example embodiment described above and various modifications may be made.

For example, in the process in FIG. 11 described above as an alternative example, the prediction may be performed as to whether the vehicle 100 is able to enter the space S on a condition that the vehicle 100 is predicted as not being able to stop outside the section R even if the deceleration is moderated. However, the prediction may be made in an opposite manner. That is, a prediction may be performed as to whether the vehicle 100 is able to stop outside the section R if the deceleration is moderated on a condition that the vehicle 100 is predicted as not being able to enter the space S.

In the example illustrated in FIG. 11, the prediction as to whether the vehicle 100 is able to stop outside the section R if the deceleration is moderated and the prediction as to whether the vehicle 100 is able to enter the space S may both be performed. However, in one example, the former prediction may not be performed and the latter prediction may be performed.

In the examples described above, the external environment recognition process related to the contact avoidance control may be performed on the basis of the image captured by the imaging device. However, in one example, the external environment recognition process may be performed, for example, with use of a radar or a map locator, i.e., by recognizing an object near the vehicle on the basis of a position sensor detecting a vehicle position and of high-resolution map information.

As described above, a vehicle control apparatus according to the example embodiment, i.e., the driving assistance controller 13 or the contact avoidance control processor 14, is a vehicle control apparatus for the vehicle 100 that includes the braking unit and the steering unit and is configured to perform the external environment recognition operation. The vehicle control apparatus includes one or more processors, i.e., the CPU of the contact avoidance control processor 14, and one or more storage media, i.e., the ROM of the contact avoidance control processor 14. The one or more storage media hold a program to be executed by the one or more processors.

The program includes one or more instructions. The one or more instructions cause the one or more processors to execute a braking delay process and a stopping control process. The braking delay process is related to the contact avoidance in which the road-side object P recognized on the traveling direction side of the vehicle 100 is set to the target object. The braking delay process is a process of performing the control of delaying the intervention by braking in a case where the contact avoidance using steering is predicted to be possible, as compared with a case where the contact avoidance using the braking is performed. The braking is to be performed by the braking unit. The steering is to be performed by the steering unit. The stopping control process is a process of performing a control of preventing the vehicle 100 from stopping within the section R corresponding to the discontinuous portion Pa in a case where the intervention by braking is to be delayed by the braking delay process, where the discontinuous portion Pa is recognized in the road-side object P, and where the vehicle 100 is predicted to be stopped within the section R corresponding to the discontinuous portion Pa on the own vehicle traveling lane by the contact avoidance using the steering.

There is a possibility of entry of another vehicle through the discontinuous portion Pa of the road-side object P. Therefore, if the vehicle 100 stops within the section R corresponding to the discontinuous portion Pa of the road-side object P on the own vehicle traveling lane, such a situation can lead to contact between the vehicle 100 and the other vehicle. According to the above-described configuration, it is possible to prevent the vehicle 100 from stopping in a place with a predicted danger in the case where the contact avoidance control targeting the road-side object P is performed.

Accordingly, it is possible to improve safety regarding the contact avoidance control.

In the example embodiment, the above-described "contact avoidance using steering" may include the contact avoidance using both braking and steering. However, the contact avoidance using steering according to an embodiment of the disclosure is not necessarily limited to the contact avoidance using braking.

Moreover, in the vehicle control apparatus according to the example embodiment, the stopping control process may include a process of performing the control of stopping the vehicle 100 on the farther side of the section R corresponding to the discontinuous portion Pa by adjusting the deceleration of the vehicle 100.

It is thus possible to prevent the vehicle 100 from stopping within the section R corresponding to the discontinuous portion Pa of the road-side object P.

Accordingly, it is possible to improve safety.

Moreover, in the vehicle control apparatus according to the example embodiment, the stopping control process may include a process of performing the control of stopping the vehicle 100 within the space S that has the discontinuous portion Pa as an opening.

It is thus possible to prevent the vehicle 100 from stopping within the section R corresponding to the discontinuous portion Pa of the road-side object P. In addition, the contact avoidance targeting the road-side object P may usually be performed on a curved road, and if the vehicle 100 stops on the curved road, the vehicle 100 can come into contact with another vehicle approaching from the rear side of the vehicle 100. However, by stopping the vehicle 100 within the space S having the discontinuous portion Pa as an opening as described above, it is possible to avoid being in contact with the other vehicle approaching from the rear side of the vehicle 100.

Accordingly, it is possible to improve safety.

Moreover, in the vehicle control apparatus according to the example embodiment, in the braking delay process, the control of delaying the intervention by braking may not be performed in a case where, although the contact avoidance using steering is predicted to be possible as the contact avoidance in which the road-side object P is set to the target object, the vehicle 100 is predicted to deviate from the own vehicle traveling lane upon being stopped by the contact avoidance.

Thus, the control of delaying the intervention by braking may not be performed in a case where the vehicle 100 is predicted to be involved in a dangerous situation if the intervention by braking for the contact avoidance is delayed.

Accordingly, it is possible to improve safety.

Moreover, in the vehicle control apparatus according to the example embodiment, in the braking delay process, whether to delay the intervention by braking may be determined on the basis of the situation prediction information regarding an external object outside the vehicle 100 other than the road-side object P in the avoidance control execution scheduled period in a case where the contact avoidance using steering is performed as the contact avoidance in which the road-side object P is set to the target object.

Thus, for example, the intervention by braking may not be delayed if, for example, the following situations are predicted: the situation in which the external object such as a pedestrian is to enter the own vehicle traveling lane in the avoidance control execution scheduled period; and the situation in which the vehicle 100 is to pass an oncoming vehicle in the avoidance control execution scheduled period. That is, it is possible to appropriately determine whether to delay the intervention by braking, depending on whether a situation involving a concern regarding a possibility of contact with the external object is predicted.

Accordingly, regarding the contact avoidance control, in a case where a control execution risk is predicted to be low, it is possible to reduce the feeling of strangeness given to the driver by delaying the intervention by braking. In a case where the control execution risk is predicted to be high, it is possible to improve safety without delaying the intervention by braking. As a result, it is possible to achieve both reduction in the feeling of strangeness given to the driver and improvement in safety.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The contact avoidance control processor 14 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the contact avoidance control processor 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the contact avoidance control processor 14 illustrated in FIG. 2.

The invention claimed is:

1. A vehicle control apparatus for a vehicle, the vehicle being configured to recognize an external environment of the vehicle, the vehicle control apparatus comprising:
   one or more processors; and
   one or more storage media non-transitory, machine-readable memories configured to hold a program to be executed by the one or more processors, wherein
   the program comprises one or more instructions,
   the one or more instructions cause the one or more processors to execute a braking delay process and a stopping control process, wherein
   the braking delay process is related to a contact avoidance in which a road-side object recognized on a region in a traveling direction in which the vehicle is traveling is set to a target object,
   the braking delay process includes performing, based on predicting that the contact avoidance is possible for the vehicle by using steering of the vehicle, a control of delaying an intervention by braking of the vehicle for the contact avoidance as compared with when predicting that the contact avoidance is possible for the vehicle by using only the braking among the steering and the braking,
   the stopping control process includes performing a control of preventing the vehicle from stopping within a section corresponding to a discontinuous portion in the road-side object based on:
   performing the control of delaying the intervention by the braking;
   recognizing that the discontinuous portion is in the road-side object;
   in response to recognizing the discontinuous portion, predicting that the vehicle is going to stop within the section corresponding to the discontinuous portion, the section corresponding to the discontinuous portion defining an entrance to a road that intersects a vehicle traveling road on which the vehicle is traveling, an entrance to a roadside evacuation region along the vehicle traveling road, or an entrance to a facility present along the vehicle traveling road; and
   in response to predicting that the vehicle is going to stop within the section, performing a control of stopping the vehicle on a farther side of the section corresponding to the discontinuous portion in the traveling direction, based on performing (i) a control of adjusting deceleration of the vehicle and (ii) the control of delaying the intervention by the braking, the farther side being outside the section and farther from the vehicle than the section relative to a perspective of the vehicle at a location of the vehicle along the traveling direction.

2. The vehicle control apparatus according to claim 1, wherein the one or more processors are configured to predict (i) whether the contact avoidance is possible for the vehicle using both the braking and the steering, and (ii) whether the contact avoidance is possible for the vehicle by using only the braking among the steering and the braking.

3. The vehicle control apparatus according to claim 1, wherein, in the braking delay process, the control of delaying the intervention by the braking is not performed in response to the vehicle being predicted to deviate from a traveling lane on which the vehicle traveling upon being stopped by the contact avoidance.

4. The vehicle control apparatus according to claim 2, wherein, in the braking delay process, the control of delaying the intervention by the braking is not performed in response to the vehicle being predicted to deviate from a traveling lane on which the vehicle traveling upon being stopped by the contact avoidance.

5. The vehicle control apparatus according to claim 1, wherein, in the braking delay process, whether to delay the intervention by the braking is determined on a basis of a state prediction information regarding an external object other than the road-side object in an avoidance control execution scheduled period in response to performing the contact avoidance by using the steering.

6. The vehicle control apparatus according to claim 2, wherein, in the braking delay process, whether to delay the intervention by the braking is determined on a basis of a state prediction information regarding an external object other than the road-side object in an avoidance control execution scheduled period in response to performing the contact avoidance by using the steering.

7. A vehicle control apparatus for a vehicle, the vehicle being configured to recognize an external environment of the vehicle, the vehicle control apparatus comprising:
one or more processors; and
one or more non-transitory, machine-readable memories configured to hold a program to be executed by the one or more processors, wherein
the program comprises one or more instructions,
the one or more instructions cause the one or more processors to execute a braking delay process and a stopping control process,
the braking delay process is related to a contact avoidance in which a road-side object recognized on a region in a traveling direction in which the vehicle is traveling is set to a target object,
the braking delay process includes performing, based on predicting that the contact avoidance is possible for the vehicle by using steering of the vehicle, a control of delaying an intervention by braking of the vehicle for the contact avoidance as compared with when predicting that the contact avoidance is possible for the vehicle by using only the braking among the steering and the braking,
the stopping control process includes performing a control of preventing the vehicle from stopping within a section corresponding to a discontinuous portion in the road-side object based on:
performing the control of delaying the intervention by the braking;
recognizing that the discontinuous portion is in the road-side object; and
in response to recognizing the discontinuous portion, predicting that the vehicle is going to stop within the section corresponding to the discontinuous portion,
wherein the stopping control process comprises a process of performing a control of stopping the vehicle within a space that has the discontinuous portion as an opening.

8. The vehicle control apparatus according to claim 7, wherein
the stopping control process comprises a process of performing a control of stopping the vehicle within a space that has the discontinuous portion as an opening
one or more processors are configured to predict (i) whether the contact avoidance is possible for the vehicle using both the braking and the steering, and (ii) whether the contact avoidance is possible for the vehicle by using only the braking among the steering and the braking.

9. The vehicle control apparatus according to claim 7, wherein, in the braking delay process, the control of delaying the intervention by the braking is not performed in a case where, although the contact avoidance using the steering is predicted to be possible as the contact avoidance in which the road side object is set to the target object, the vehicle is predicted to deviate from the traveling lane upon being stopped by the contact avoidance in response to the vehicle being predicted to deviate from the traveling lane upon being stopped by the contact avoidance.

10. The vehicle control apparatus according to claim 8, wherein, in the braking delay process, the control of delaying the intervention by the braking is not performed in response to the vehicle being predicted to deviate from the traveling lane upon being stopped by the contact avoidance.

11. The vehicle control apparatus according to claim 7, wherein, in the braking delay process, whether to delay the intervention by the braking is determined on a basis of a state prediction information regarding an external object other than the road-side object in an avoidance control execution scheduled period in response to performing the contact avoidance by using the steering.

12. The vehicle control apparatus according to claim 8, wherein, in the braking delay process, whether to delay the intervention by the braking is determined on a basis of a state prediction information regarding an external object other than the road-side object in an avoidance control execution scheduled period in response to performing the contact avoidance by using the steering.

* * * * *